United States Patent
Rog et al.

(10) Patent No.: US 6,441,780 B1
(45) Date of Patent: Aug. 27, 2002

(54) RECEIVER FOR PSEUDO-NOISE SIGNALS FROM A SATELLITE RADIO-NAVIGATION SYSTEMS

(75) Inventors: Andrey Leonidovich Rog, Moscow; Boris Dmitrievich Fedotov, Saint-Petersburg; Vladimir N. Ivanov, Saint-Petersburg; Alexander N. Korotkov, Saint-Petersburg; Viktor I. Malashin, Saint-Petersburg; Serguey B. Pisarev, Saint-Petersburg; Denis G. Poverennyi, Saint-Petersburg; Irina E. Galichina, Saint-Petersburg; Mikhail P. Soshin, Saint-Petersburg; Boris V. Shebshaevich, Saint-Petersburg; Vyacheslav S. Nikulin, Saint-Petersburg; Oleg D. Osipov, Saint-Petersburg; Mikhail Yu Silin, Moscow; Anatoly N. Soldatenkov, Saint-Petersburg, all of (RU); Dohyoung Chung, Seoul; Young Chan Lee, Suwon, both of (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/600,013

(22) PCT Filed: Nov. 11, 1998

(86) PCT No.: PCT/RU98/00369

§ 371 (c)(1),
(2), (4) Date: Sep. 5, 2000

(87) PCT Pub. No.: WO00/28677

PCT Pub. Date: Mar. 18, 2000

(51) Int. Cl.$^7$ .......................... H04B 7/185; H04B 1/10; H04L 27/30
(52) U.S. Cl. ................... 342/357.12; 455/296; 375/136
(58) Field of Search ................. 342/112–113, 115–116, 342/127–132, 350, 352, 357.01–357.04, 357.06, 357.09, 357.12, 357.15, 358, 378, 385, 421, 394–395, 450, 457; 375/136–137, 144, 340, 147–150, 316, 326, 327–332, 334–335, 342–346, 349–350, 365–369, 373, 371, 375–376, 130, 140; 370/515–519; 701/200, 207, 213–215; 455/130, 150.1, 296, 269

(56) References Cited

U.S. PATENT DOCUMENTS

| | | | | |
|---|---|---|---|---|
| 5,953,367 | A | * | 9/1999 | Zhodzicshsky et al. ..... 375/206 |
| 6,031,882 | A | * | 2/2000 | Enge et al. ................. 375/343 |
| 6,313,789 | B1 | * | 11/2001 | Zhodzishsky et al. . 342/357.12 |

FOREIGN PATENT DOCUMENTS

| | | |
|---|---|---|
| EP | 0079689 | 5/1983 |
| EP | 0230130 | 7/1987 |
| EP | 0501829 | 9/1992 |
| WO | 97/14977 | 4/1997 |

* cited by examiner

Primary Examiner—William A. Cuchlinski, Jr.
Assistant Examiner—Thu Nguyen
(74) Attorney, Agent, or Firm—Sughrue Mion, PLLC

(57) ABSTRACT

Receiver of pseudonoise signals of satellite radio navigation systems for determining coordinates and time using signals of GLONASS and GPS systems, characterized by small dimensions and absence of complicated elements such as digitizers.

4 Claims, 12 Drawing Sheets a)

â)

RECEIVER FOR PSEUDO-NOISE SIGNALS FROM A SATELLITE RADIO-NAVIGATION SYSTEMS

TECHNICAL FIELD

The invention relates to radio navigation and, more specifically, it relates to receivers of pseudonoise signals of the satellite radio navigation systems (SRNS) GPS (USA) and GLONASS (Russia) performing simultaneous reception of the signals of the C/A codes of these systems in the L1 frequency range.

BACKGROUND OF THE INVENTION

The receivers of digital pseudonoise signals of the SRNS GLONASS (cf. 'Global Navigational Satellite System "GLONASS". Interface Control Document. KNITS VKS Russia ", 1995) [1] and GPS (cf. "Global Position System. Standard Positioning Service. Signal Specification." USA, 1993) [2] are now widely used for finding the coordinates (latitude, longitude, height), speed of objects, and time. The fundamental distinctions between the SRNS GPS and the GLONASS consist in the use of different, although adjacent, frequencies on the L1 band, use of different pseudonoise modulating codes and use of both code and frequency division of signals of the different satellites in the system. Thus, during operation on the L1 frequency band the SRNS GPS satellites transmit signals modulated by different pseudonoise codes on one carrier frequency of 1575.42 MHz while the SRNS GLONASS satellites transmit signals modulated by the same pseudonoise code on different carrier (lettered) frequencies laying in the adjacent frequency zone. The nominal values of the lettered frequencies in the SRNS GLONASS system for the L1 frequency range are set up according to the following rule:

$$f_{j,i} = f_{j,0} + i \cdot \Delta f_j,$$

where $f_{j,i}$ are the nominal frequency values $f_{j,0}$ is the zero lettered frequency;

i is the number of letters;

$\Delta f_j$ is the spacing between the lettered frequencies.

For the L1 range $f_{1,0}$=1602 MHz, $\Delta f_1$=0.5625 MHz.

The distinctions existing between the SRNS GPS and GLONASS signals stipulated by the code division in the SRNS GPS and the frequency division in the SRNS GLONASS result in different hardware used for reception and correlation processing of these SRNS signals to allow one to carry out the radio navigation measurements. Known in the art (for example, from Global Positioning System (GPS) Receiver RF Front End. Analog-Digital Converter, (FIG. 1), Rockwell International Proprietary Information Order Number. May 31, 1995 [3], is a pseudo-random noise signal receiver comprising a radio-frequency converter including a low-noise amplifier, a filter, a first mixer, a first intermediate frequency amplifier, a quadrature mixer, two quantizers for the inphase and quadrature channels, a signal shaper producing a first heterodyne frequency (1401.51 MHz), a divider producing a signal of a second heterodyne frequency from the signal of the first heterodyne frequency, and a correlation processing unit.

The device solves a technical problem of reception and correlation processing of the SRNS GPS signals for performing the radio navigation measurements. This device does not allow one to solve the problem of reception and correlation processing of the SRNS GLONASS signals.

Also known in the art (cf. FIG. 9.2 on pages 146 to 148 in the book "Network Satellite Systems", by V. S. Shebshaevich, P. P. Dmitriev, N. V. Ivantsevich, et all. Moscow, "Radio i Syaz", 1993)[4]) a receiver of the SRNS GLONASS pseudonoise signals ("Single-Channel Users' Apparatus "ACH-37" for the GLONASS Systems"). The receiver comprises an antenna, a low-noise amplifier-converter, a radio-frequency converter, a digital processing device, and a navigational processor. The low-noise amplifier-converter includes band-pass filters, an amplifier and a first mixer. The radio-frequency converter includes an intermediate-frequency amplifier, a phase demodulator, a second mixer, with a mirror channel phase suppressor, a limiter and a synthesizer of lettered frequencies operating on the signals of a reference generator. The digital processing device includes a pseudo-random sequence generator (PSG) with a digital clock-signal generator of the PSG system, a digital Doppler carrier drift generator, and a phase-code converter with a storage unit for storing the digital samples. The navigational processor is based on a microprocessor series 1806BM2. The lettered frequency synthesizer generates output signals according to the lettered frequencies of the received SRNS GLONASS signals. The spacing between the lettered frequencies generated by the synthesizer is equal to 0.125 MHz. The first heterodyne frequency signal is produced by multiplying the synthesizer output signal by four, while the second heterodyne frequency signal is produced by dividing the frequency at the output of the frequency synthesizer by two. The receiver solves the technical problem of reception and correlation processing of the SRNS GLONASS signals for the next radio navigation measurements and positioning, however, it does not allow one to solve the problem of reception and correlation processing of the SRNS GPS signals.

In spite of the difference between the SRNS GPS and GLONASS, their similarity on designation, ballistic build-up of the orbital groups of satellites and used frequency range allows one to formulate and solve the problems associated with the creation of the receivers capable of processing the signals of these two systems. The result achieved consists in a high reliability, authenticity and accuracy of defining the location of an object, in particular, due to a possibility of selecting a working constellations of satellites with the best geometrical parameters [4, page 160]. Known among the devices performing the reception and correlation processing of the SRNS GPS and GLONASS signals is a receiver of SRNS GPS and GLONASS signals operating in the L1 frequency range, described in ([4], page 158–161, FIG. 9.8). The receiver comprises an antenna, a radio-frequency converter, a reference generator and a processor for primary processing. The radio-frequency converter comprises a frequency converter ("duplexer") performing the frequency division of the SRNS GPS and GLONASS signals, band-pass filters and amplifiers in the GPS and GLONASS channels, a mixer, a switchboard applying the SRNS GPS or GLONASS signals to the signal input of the mixer, a switchboard applying the first heterodyne signal to the reference input mixer for the GPS channel or the GLONASS channel. Due to the appropriate choice of the heterodyne signal frequency, the first intermediate frequency (IF) is constant for the SRNS GPS and GLONASS signals and all subsequent operations of signal processing are common for both systems. The processor for primary signal processing includes a multiplexer with a ROM memory unit, a digital generator of lettered frequencies, a digital correlator, a PSG generator and a microprocessor. A disadvantage of this device is that the reception, conversion and correlation signal processing of each SRNS is carried out in series using the same radio channel thereby increasing the time required for the subsequent processing for obtaining the navigational information. Furthermore, the receiver includes a complicated switched high-frequency synthesizer for generation of two different heterodyne signals used for processing the SRNS GPS and GLONASS signals simultaneously.

Among the integrated receivers of pseudonoise SRNS GPS and GLONASS signals in question there is also known a device described by Riley S., Howard N., Aardoom E., Daly P., Silvestrin P. in "A Combined GPS/GLONASS High Precision Receiver for Space Applications"), Proc. Of ION GPS-95, Palm Springs, Calif., U.S., Sep. 12–15, 1995, pp.835–844) [5] which solves the problem of simultaneous reception of signals of both SRNS types. This receiver is taken as a prior art.

A block diagram of the receiver for reception of the SRNS GPS and GLONASS signals, taken as a prior art, is shown in FIGS. 1–3. The prior art receiver (FIG. 1) comprises an antenna 1, a radio-frequency converter 2, a digitizer 55 and an N-channel digital correlator 3 connected in series, the correlator comprising N channels ($4_1$, $4_2$ . . . $4_N$) and a processor 5. The radio-frequency converter 2 of the prior art receiver comprises (FIG. 2) an input unit 6, whose input is connected to an antenna 1, a block 7 of the first conversion of frequency of signals, a first channel 8 and a second channel 9 of the second conversion of frequency of the SRNS GPS and GLONASS signals, respectively, and an apparatus 10, for generation of signals of clock and heterodyne frequency, comprising an individual clock-signal generator and three separate units for generation of signals of heterodyne frequencies, or three frequency synthesizers (not shown in FIG. 2). The input unit 6 used for preliminary filtering the SRNS GPS and GLONASS input signals comprises at least one band-pass filter.

The unit 7 used for the first conversion of frequency of the SRNS GPS and GLONASS signals, should include at least one amplifier and a mixer. In the circuitry under consideration the unit 7 comprises a first amplifier 14, a mixer 15 and a second amplifier 16 connected in series. The channel 8 of second frequency converter of the SRNS GPS signals comprises a filter 17 and a mixer 18 connected in series, the mixer output being an output of the channel 8, i.e. the output for the SRNS GPS signals. The channel 9 of the second conversion of frequency of the SRNS GLONASS signals comprises a filter 21 and a mixer 22 connected in series, the mixer output being an output of the channel 9, i.e. the output for the SRNS GLONASS signals. The inputs of the filters 17 and 21, being inputs, respectively, of the first 8 and second 9 channels of the second conversion of frequency of the signals, are connected to the output of the amplifier 16, i.e. to the output of the unit 7 of the first conversion of frequency of the signals. The input of the amplifier 14, i.e. the input of the unit 7, is connected to the output of the unit 6. The reference input of the mixer 15 of the first signal conversion of frequency unit 7 is connected to the signal output of the first heterodyne frequency of the apparatus 10, formed by the output of the unit producing the signal of the first heterodyne frequency (not shown in FIG. 2). The reference inputs of the mixers 18 and 22 of the first 8 and second 9 channels of the second conversion of frequency of signals are connected, respectively, to the signal outputs of the second and third heterodyne frequencies of the apparatus 10, formed by the outputs of the respective units generating the signals of the second and third heterodyne frequencies (not shown in FIG. 2). The outputs of the mixers 18 and 22 of the first 8 and second 9 channels of the second conversion of frequency of signals and the clock signal output of the apparatus 10, formed by the output of the clock-signal generator (not shown in FIG. 2) are signal and clock outputs of the radio-frequency converter 2 of the prior art receiver. These outputs are connected to the respective signal and clock output of the digitizer 55.

The radio-frequency converter 2 of the prior art receiver operates as follows: the SRNS GPS and GLONASS signals of the L1 frequency range from the input antenna 1 through the input unit 6, performing the frequency filtering of signals of the given frequency range, are applied to the input of the unit 7 of the first conversion of frequency of the signals; in the unit 7 the SRNS GPS and GLONASS signals of the L1 frequency range are amplified in the first amplifier 14, converted by frequency in the mixer 15 and amplified in the second amplifier 16 (IF amplifier); for the first conversion of frequency realized in the unit 7, the prior art receiver makes use of the signal of the first heterodyne frequency $f_{r1}$=1416 MHz fed from the respective output of the apparatus 10. In the apparatus 10 the signals of the first heterodyne frequency $f_{r1}$ are synthesized with the help of a separate signal shaping unit of the first heterodyne frequency—the first frequency synthesizer (not shown in FIG. 2). The SRNS GPS and GLONASS signals, converted in the unit 7, of the L1 frequency range are applied to the inputs of the first 8 and second 9 channels for the second conversion of frequency of the signals, i.e. to the inputs of filters 17 and 21; each of these filters performs filtering of signals of one SRNS, namely, the filter 17 filters the SRNS GPS signals and the filter 21 filters the SRNS GLONASS signals. The converted signals, relieved from the out-of-band interference by the filters 17 and 21 and allocated in the systems (GPS and GLONASS) in each of the channels 8 and 9, are applied to the signal inputs of the mixers 18 and 22, respectively. For the second conversion of frequency in the channels 8 and 9, the prior art receiver makes use of the signals of the second and third heterodyne frequencies $f_{r2}$=173.9 MHz and $f_{33}$=178.8 MHz synthesized with the help of the respective separate units shaping the signals of the second and third heterodyne frequencies, that is the second and third frequency synthesizers (not shown in FIG. 2), included in the apparatus 10; in so doing the signal of the second heterodyne frequency $f_{r2}$=173.9 MHz is used for conversion of the SRNS GPS signals in the mixer 18 of the first channels 8, while the signal of the third heterodyne frequency $f_{r3}$=178.8 MHz is used for conversion of the SRNS GLONASS signals in the mixer 22 of the second channels 9; the SRNS GPS and GLONASS signals, converted with the help of the mixers 18 and 22 are applied, respectively, to the outputs of channels 8 and 9; the SRNS GPS and GLONASS signals, converted by frequency in the channels 8 and 9, as well as the signal of the clock rate FT produced in the apparatus 10 with the help of a separate clock-signal generator, for example, by means of a quartz-crystal oscillator (not shown in FIG. 2), produce signals at the output of the radio-frequency converter 2 of the prior art receiver; the output signals of the radio-frequency converter 2 of the prior art receiver are applied to a digitizer 55 (FIG. 1), first performing 4-bit analog-digital conversion of these signals in the respective analog-to-digital converters (ADC), and then shaping 2-bit samples of two quadrature components (I) and (Q) of these signals in the digital filters. The signal of the clock frequency FT generated in the radio-frequency converter 2, is used as a clock signal, setting the sampling rate in time when effecting the analog-digital conversion. To provide the 4-bit analog-digital conversion without loss of the navigational information, the output signals of the radio-frequency converter 2 of the prior art receiver are matched by frequency and spectrum with the clock frequency FT so as to meet the Nyquist's theorem; the matching is provided by selecting definite values of the clock and heterodyne frequencies; the clock frequency value defining the frequency of the next analog-digital conversion in the digitizer 55, i.e. sampling rate with time, is taken as $F_T$=57.0 MHz; on the basis of this frequency the matched values of the heterodyne frequencies $f_{r2}$=173.9 MHz and $f_{r3}$=178.8 MHz for the second conversion of frequency of the signals are chosen, namely, so that the average frequency of the SRNS GPS and GLONASS signals on the second intermediate frequency would be close to 14.25 MHz. This makes it possible to digitize the signals in the 4-bit analog-digital converters of a digitizer 55 with a clock frequency $F_T$=57.0 MHz (4×14.25 MHz) and produce in the digital filters of the digitizer 55 two-bit samples of the inphase (I) and quadrature (Q) components of the SRNS GPS and GLONASS signals with a sampling rate twice as low as $F_T$, i.e. equal to 28.5 MHz (2×14.25 MHz) [5]; from the digitizer 55 the inphase (I) and quadrature (Q) samples of the SRNS GPS and GLONASS signals are fed through a two-wire link to the first (GPS) and second (GLONASS) signal inputs of the N channel digital correlator 3 performing the digital processing of the signals of the SRNS GPS and GLONASS satellites with the help of its channels 4 in an arbitrary combination; applied to the clock input N of the channel digital correlator 3 from the clock output of the digitizer 55 is a clock signal with a frequency of $F_T/2$ (28.5 MHz).

The block diagram of the channel 4 of N-channel digital correlator 3 is shown in FIG. 3. The channel 4 comprises an input signal switch 31 for switching the input signals, a data exchange unit 32, storage units 33–36, a digital carrier generator 39, a control register 40, a digital code generator 41, a reference C/A code generator (GPS and GLONASS), a programmable delay line 43, digital mixers 44, 45, correlators (digital demodulators) 46–49. The data exchange unit 32 is connected through respective data buses to the processor 5, as well as to the outputs of the storage units 33–36 controlling the input of the digital carrier generator 39, controlling the input of the control register 40, the control input of the digital code generator 41, and the first input of the reference C/A code generator. The first and second inputs (the GPS and GLONASS inputs) of the input signal switch 31 are connected to the respective signal inputs of the N-channel digital correlator 3. Applied to these inputs of the input signal switch 31 are two-bit samples of the inphase (I) and quadrature (Q) components of the SRNS GPS and GLONASS signals at a sampling rate of $F_T/2$ (28.5 MHz). The control input of the input signal switch 31 is connected to one of the outputs of the control register 40. Other outputs of the control register 40 are connected to the respective inputs of the programmable delay line 43 and to the C/A code reference generator. The output of the input signal switch 31 is connected to the first inputs of digital mixers 44 and 45 whose second inputs are fed with the reference-frequency signals "cos" and "sin" from the respective outputs of the digital controlled carrier generator 39. The clock inputs of the storage units 33–36, the digital carrier generator 39, the digital code generator 41 and the programmable delay line 43 are connected to the clock input of the N-channel digital correlator 3. The outputs of the digital mixers 44 and 45 are connected to the first inputs of correlators (digital demodulators) 46, 47 and 48, 49 respectively. Applied to the second inputs of correlators (digital demodulators) 46, 49 and 47, 48 are respectively the exact "P" (punctual) and difference "E–L" (Early-Late) or early "E" copies of the reference C/A code of the SRNS GPS or GLONASS system from the respective outputs of the programmable delay line 43 whose input is connected to the output of the reference C/A code generator 42, producing the C/A code of the SRNS GPS or GLONASS system. The outputs of the correlators (digital demodulators) 46–49 are connected to the inputs of the storage units 33–36 respectively.

The clock signal necessary for the operation of the code generator 41, at a frequency of 1.023 MHz for the GPS or 0.511 MHz for GLONASS, is applied to its input from the output of the digital code generator 41. The first input of the control register 40 is connected to the output of the digital controlled code generator 41.

The channel 4 of the N-channel digital correlator 3 (FIG. 3) of the prior art receiver operates as follows: by a command of the processor 5 sent to the control register 40 through the data exchange unit 32, the input signal switch 31 sends two-bit quadrature signals (I and Q) of the SRNS GPS or GLONASS to the channel 4 from the output of the digitizer 55, the digital carrier generator 39 produces the "sin" and "cos" of the IF signals of the preset SRNS GLONASS letter, whose binary code is shaped by the processor 5 through the data exchange unit 32, or of the IF signals of SRNS GPS. With the working algorithm of the digitizer 55 and the sampling rate in the channels 4 of the digital correlator 3 equal to $F_T/2$ 28.5 MHz used in the prior art receiver frequency plan of the radio-frequency converter 2, the values of the intermediate frequencies of the signals of the SRNS GPS or GLONASS satellites lay in a range of ±14.25 MHz. The digital mixers 44 and 45 ensure selection of a preset SRNS GLONASS letter or the signals of the SRNS GPS satellites and transfer the spectra of these signals into the basic frequency band (on the zero frequency). The digital demodulators (correlators) 46, 49 and 47, 48 perform correlation of the received signals with exact "P" (Punctual) and difference "E–L" (Early-Late) or early "E" copies of the reference C/A code of the SRNS GPS or GLONASS respectively. These code copies are produced by the programmable delay line 43, which under the control of the processor 5 (through the data exchange unit 32), allows one to change the spacing between the early and late copies of the C/A code from 0.1 up to 1 length of characters of the C/A code and, hence, to form a "narrow discriminator" ("narrow correlator") in the code tracing system (A. J. Van Dierendonck., Pat. Fenton and Tom Ford. Theory and Performance of Narrow Correlator Spacing in a GPS Reciever. Navigation: Jornal of The Institute of Navigation, Vol.39, No. 3, 1982 [6], U.S. Pat. No. 5,390,207, cl. G01 S 5/02, H04 B 7/185, published 14.02.95. (Fenton, A. J. Van Dierendonck, "Pseudorandom noise ranging receiver which compensates for multipath distortion by dynamically adjusting the time delay spacing between early and late correlators") [7], U.S. Pat. No. 5,495,499, cl. H04 L 9/00, published 27.02.96. (Fenton, A. J. Van Dierendonck, "Pseudorandom noise ranging receiver which compensates for multipath distortion by dynamically adjusting the time delay spacing between early and late correlators") [8].

The reference pseudorandom C/A codes of the signals of the SRNS GPS or GLONASS satellites are produced by the reference C/A code generator 42 by using the code clock frequency of 1.023 MHz for the GPS or 0.511 MHz for the GLONASS from the output of the digital code generator 41. The selection of a type of the produced pseudorandom code sequence and a value of the code clock frequency is carried out by commands from the processor 5 applied to the inputs of these generators through the data exchange unit 32. The results of correlation of the signals are stored in the storage units 33–36. For the case of operation with the punctual and difference copies of the input signal, the storage unit 33 stores the quadrature component of correlation of the punctual copy of the signal Qp, the storage unit 34 stores the quadrature component of correlation Qd, the unit 36 stores the inphase component of the punctual copy Ip, unit 35 stores the inphase component of a difference copy Id. The data accumulated in the storage units 33–36 are periodically read out through the data exchange unit 32 by the processor 5, in which all algorithms of signal processing, i.e. algorithms of searching the signals, tracing the carrier and code, reception of the service information are effected. The storage period is equal to the C/A code period, i.e. to 1 ms. Using the signal processing results, the processor 5 controls the operation of the channel 4, giving out the carrier frequency estimated values to the digital carrier generator 39 and sending the code clock rate to the digital code generator 41.

From the above description of the radio-frequency converter 2 of the prior art receiver, it follows that in the prior art receiver the following signals of the clock and heterodyne frequencies are generated: a clock frequency of 57.0 MHz, a first heterodyne frequency of 1416 MHz, a second heterodyne frequency of 173.9 MHz, a third heterodyne frequency of 178.8 MHz. These signals of heterodyne frequencies are produced in the radio-frequency converter 2 of the prior art receiver by means of a heterodyne circuit whose complexity is stipulated by the fact that none of the heterodyne frequencies can be obtained from the other heterodyne frequency by simple multiplication or division. Therefore, the heterodyne frequencies are synthesized with the help of three separate synthesizers of heterodyne frequencies which are included into the structure of the apparatus 10 (not shown in FIG. 2), each of which represents an independent radio engineering device which are difficult to manufacture due to the high requirements imposed on the stability of synthesized frequencies (relative frequency instability of $10^{-11}$ to $10^{-12}$ for 1 second (cf Moses I. Navstar Global Positioning System Oscillator Requirements for the GPS Manpack. Proc. of the 30th Annual Frequency Control Sympos., 1976, pp.390–400, [9]), since it has an essential effect on the output characteristics of the radio-frequency converter. Besides, a high value of the generated clock frequency (57.0 MHz) complicates the equipment for performing the next digital signal processing, because the realization of the channels 4 of the digital correlator 3 directly on the clock frequency of 57.0 MHz is a complicated engineering task and, in addition, considerably increases the power consumed by the receiver. To reduce the clock frequency, on which the channels 4 of the digital correlator 3 must operate, the prior art receiver is provided with a special unit—a digitizer 55. This unit operates on a frequency of 57.0 MHz and converts the real SRNS GPS or GLONASS signals, produced by the radio-frequency converter 2, into complex signals represented by two quadrature components: inphase and quadrature. Due to this operation performed by the digitizer 55, in the prior art receiver it is possible to make the working clock frequency of the channels 4 of the digital correlator 3 twice as low without power losses. A disadvantage of the prior art is the complexity of the equipment used for shaping the signals of the clock and heterodyne frequencies in the radio-frequency converter 2, in particular, a significant numbers of frequency synthesizers. Besides, it is necessary to use an expensive device similar to the digitizer 55. The possibility of creating small-sized low-power consumption and cheap integrated pseudonoise receivers of the SRNS GPS and GLONASS signals to be used by a wide range of consumers depends on the solution of this problem. At the same tune, when using such receivers, it is necessary to solve the problem associated with operation under conditions of noise, interference and reflected signals. The matter is that the receiver of the pseudonoise SRNS GPS and GLONASS signals operates with a radio signal consisting of a plurality of signals, transmitted by the satellites of these systems within the line-of-sight, the noise component, and also the component due to the reflection of the forward signal from different objects on the earth surface. The influence of the latter component lowering the accuracy of performances of the receiver, is known as "multipath" distortion. As follows from the description of the prior art receiver [5], the multipath distortion is corrected by using the processing mode called the "narrow discriminator" or "narrow correlator" [6], [7], [8], permitting under certain conditions to reduce the code tracing error to 0.4–0.05 length of the character (but do not eliminate it completely) at delays of the reflected signal in a range from 0 to 1 length of the C/A code character.

DISCLOSURE OF THE INVENTION

In view of the above it is clear that the problem of reducing the code tracing errors in the pseudonoise signals of the SRNS receiver in the case of the multipath distortion is urgent. The claimed invention is aimed at a development of an integrated receiver of pseudonoise signals of the C/A codes of the SRNS GPS and GLONASS systems in the L1 frequency range characterized by a small number of synthesizers used for shaping the signals of clock and heterodyne frequencies; exclusion of the device similar to the digitizer 55 and reduction of the multipath distortion errors when tracing the C/A code a majority of practically important cases. The essence of the invention includes a development of a receiver of the pseudonoise signals of satellite radio navigation systems comprising an antenna and a radio-frequency converter connected in series, as well as an N-channel digital correlator and a processor connected in series, the radio-frequency converter comprising an input unit connected to the antenna and including at least one band-pass filter, a unit for first conversion of frequency of signals comprising at least one amplifier and one mixer, a first and a second channels of second conversion of frequency of signals of the GPS and GLONASS satellite radio navigation systems, respectively, connected to the output of the unit of the first conversion of frequency of signals, each of the first and second channels comprising a filter and a mixer connected in series, and an equipment including a unit for producing a signal of a first heterodyne frequency used for shaping the signals of clock and heterodyne frequencies; the signal output of the first heterodyne frequency, formed by the output of the unit shaping the signal of the first heterodyne frequency, is connected to the reference input of the mixer of the unit of the first conversion of frequency of signals; the output of the signal of the second heterodyne frequency is connected to the reference input of the mixer of the first channel for the second conversion of frequency of signals; the outputs of the first and second channels of the second conversion of frequency of signals and the output of the clock frequency signal of the equipment for shaping the signals of the clock and heterodyne frequency form signal and clock outputs of the radio-frequency converter; in the N-channel digital correlator each of its channels comprises an input signal switch whose first and second inputs are connected to the first and second signal inputs of the N-channel digital correlator; a data exchange unit connected through respective data buses to said processor and to the outputs of the first, second, third and fourth storage units, the control input of the digital carrier generator, the control input of the control register, the control input of the digital code generator and the first input of the reference C/A code generator; the clock inputs of the storage units, the digital code generator, the digital carrier generator and programmable delay line being connected to the clock input of the N-channel digital correlator; the output of the input signal switch is connected to the first inputs of the digital mixers of the inphase and quadrature correlation processing channels whose second inputs are connected, respectively, to the "cosine" and "sine" outputs of the digital carrier generator while the outputs are connected to the junction between the first inputs of the first and second correlators and to the junction between the first inputs of the third and fourth correlators whose outputs are connected, respectively, to the signal inputs of the first, second, third and fourth storage units; the second inputs of the first and fourth correlators being connected to the output of the exact "P" (punctual) copy of the reference C/A code of the programmable delay line whose first input is connected to the output of the reference C/A code generator whose second input is connected to the output of the digital code generator; the second input of the programmable delay line and the third input of the reference C/A code generator are connected, respectively, to the first and second outputs of the control register whose third output is connected to the third input of the input signal switch, the signal and clock outputs of the radio-frequency converter are connected, respectively, to the first and second signal and clock inputs of the N-channel digital correlator; in this case, in the radio-frequency converter in each of the channels of the second conversion of frequency of the signals the mixer output is connected to the channel output through a controlled-gain amplifier and a threshold device connected in series, said threshold device being made as a two-bit level-controlled quantizer; the reference input of the mixer of the second channel of the second conversion of frequency of signals is connected to the signal output of the second heterodyne frequency of the equipment shaping the signals of clock and heterodyne frequency, in which the output of the unit producing the signal of the first heterodyne frequency is connected to a first and a second units for dividing the frequency by eight whose outputs form, respectively, a signal output of the second heterodyne frequency and an output of the clock frequency signal; the structure of each of the channels of the N-channel digital correlator being additionally provided with a fifth and a sixth storage units whose outputs are connected through respective data buses to the data exchange unit and the clock inputs are connected to the clock input of the N-channel digital correlator, a fifth and a sixth correlators whose outputs are connected, respectively, to the signal inputs of the fifth and sixth storage units; a delayed strobe shaper, a key and an adder whose first input is connected to the output of the difference "E–L" or early "E" copy of the reference C/A code of the programmable delay line, the second input being connected to the output of the key and the output being connected to the second inputs of the second and third correlators; the first inputs of the fifth and sixth correlators are connected, respectively, to the outputs of the first and second mixers; the output of the delayed strobe shaper is connected to the second inputs of the fifth and sixth correlators and to the signal input of the key whose control input is connected to the fourth output of the control register; the first input of the delayed strobe shaper is connected to the output of the punctual "P" copy of the reference C/A code of the programmable delay line and its second input is connected to the output of the digital code generator.

BRIEF DESCRIPTION OF THE DRAWINGS

The essence of the claimed invention, the possibility of its realization and industrial applicability are illustrated in the appended drawings and frequency diagrams shown in FIGS. 1–12, in which:

THE PREFERRED EMBODIMENT OF THE INVENTION

Figure 1:
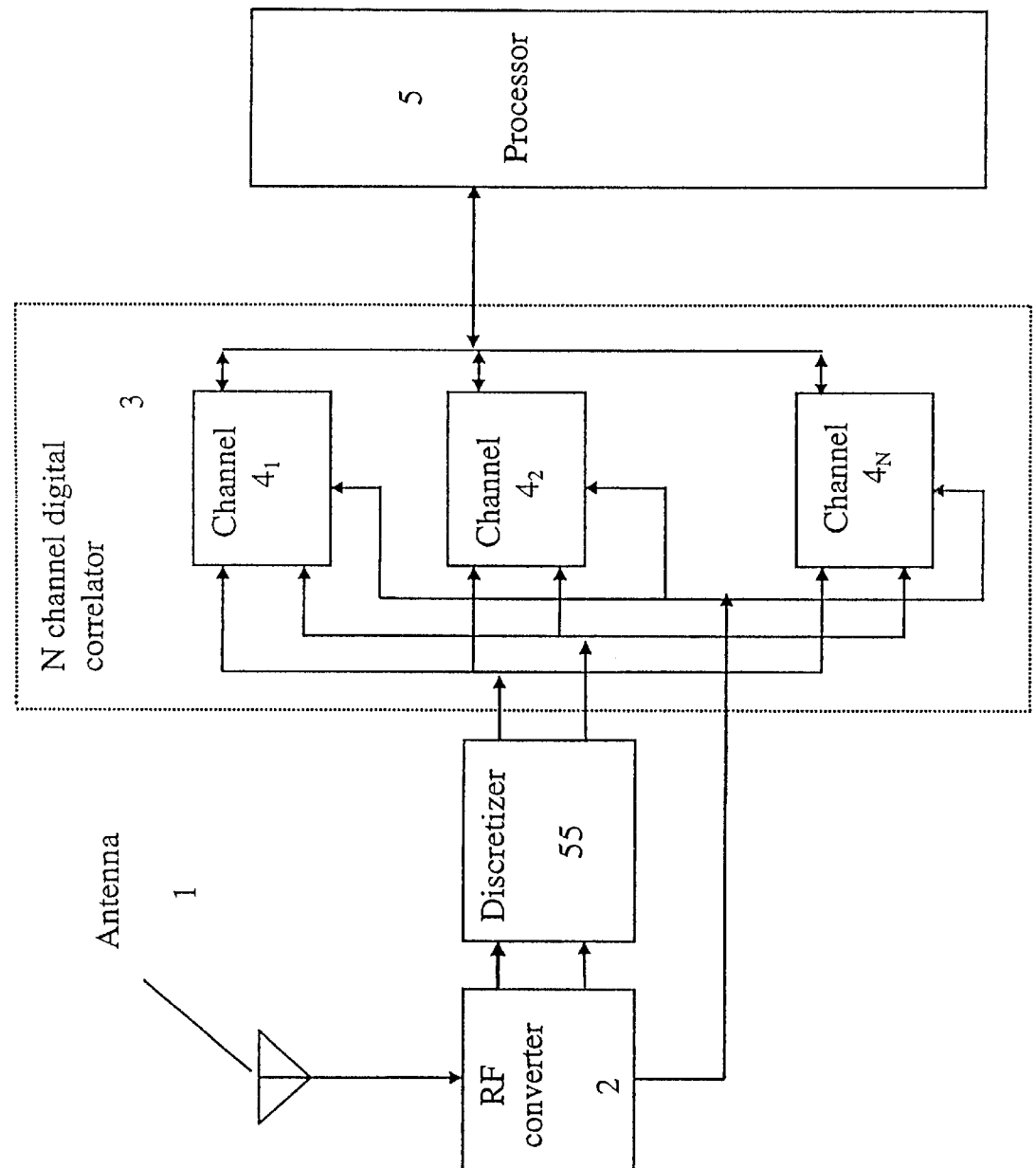
FIG. 1 is a block diagram of the prior art device.
Figure 2:
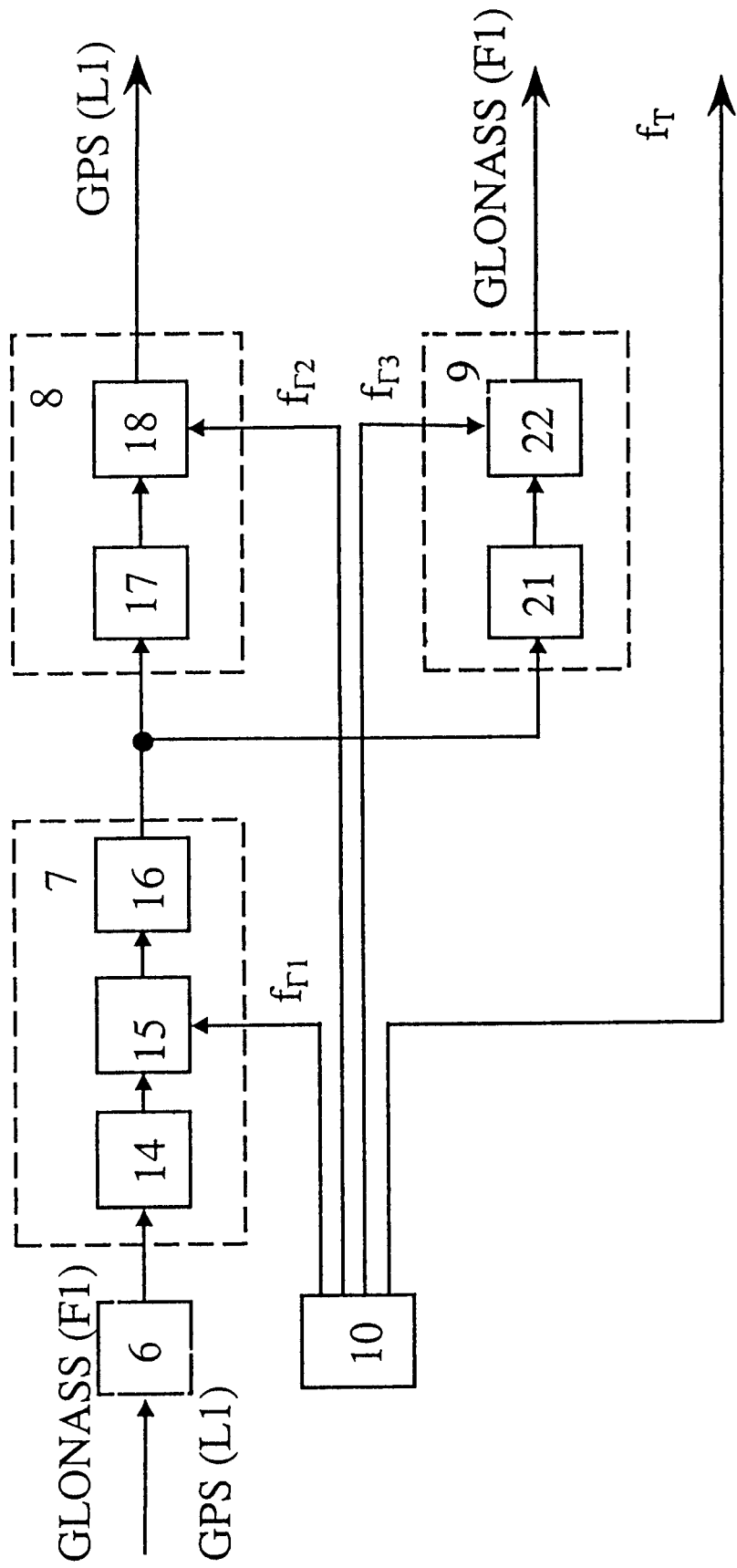
FIG. 2 is a block diagram of the radio-frequency converter of the prior art device.
Figure 3:
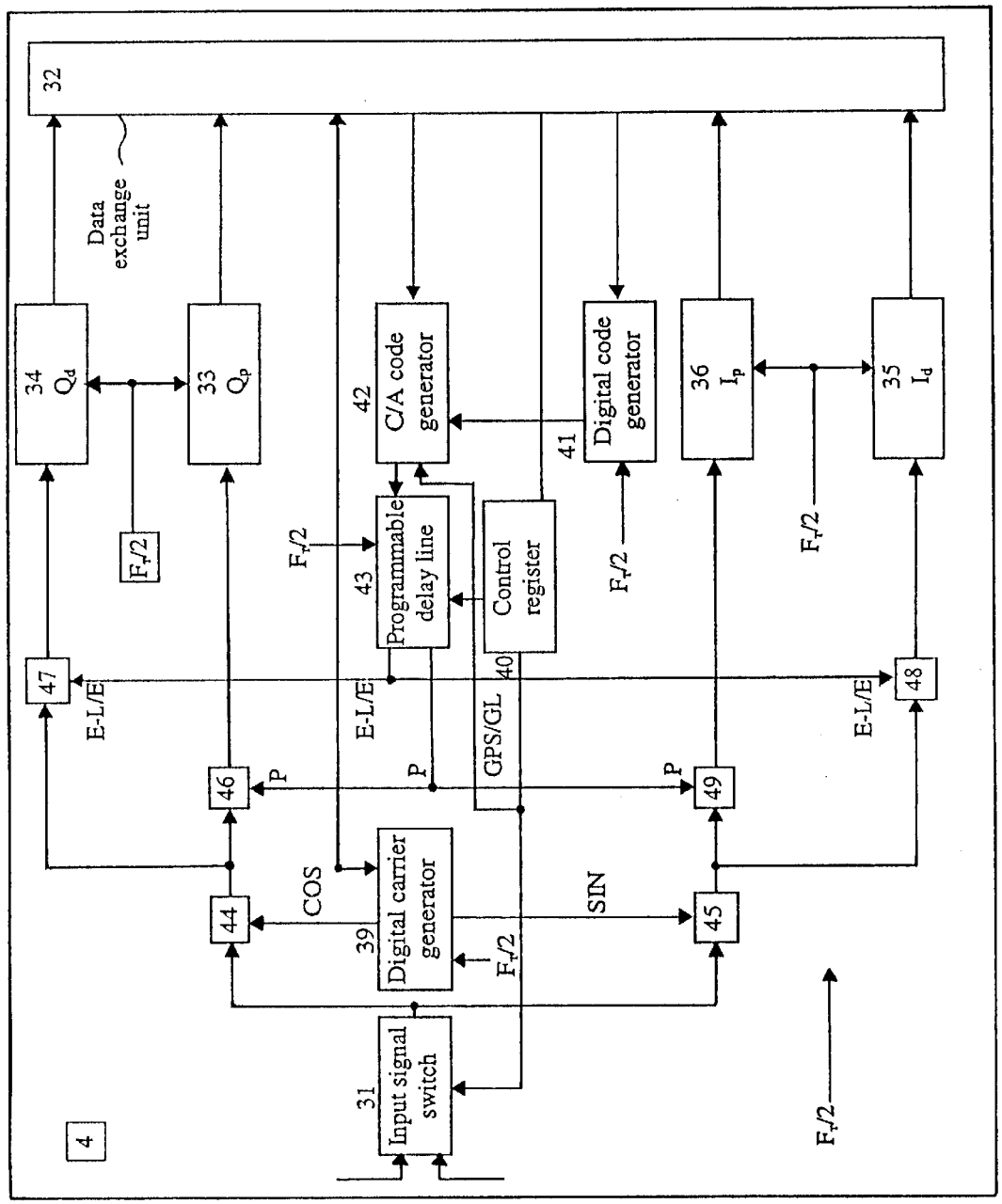
FIG. 3 is a block diagram of one of the channel of the N-channel digital correlator of the prior art device.
Figure 4:
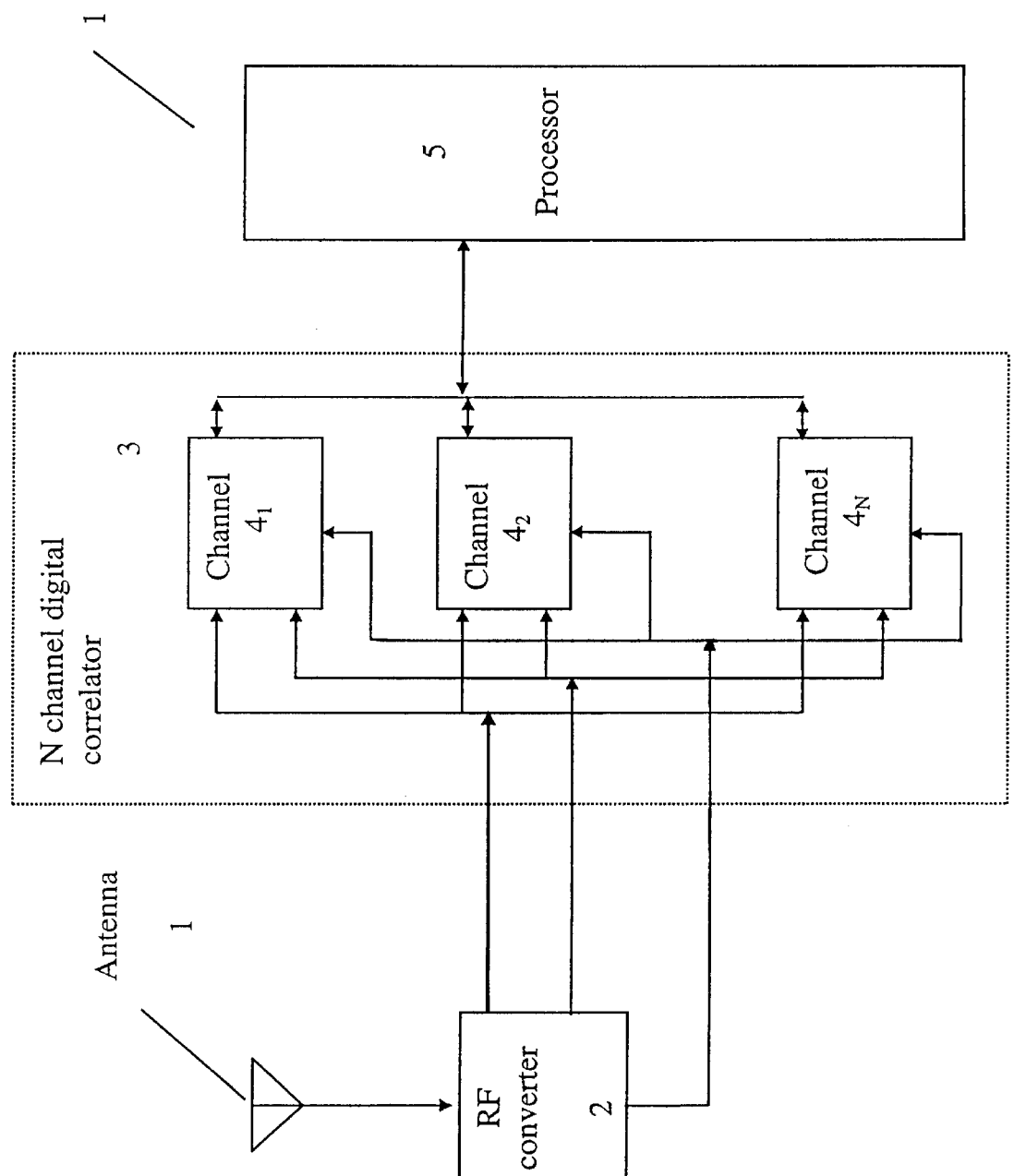
FIG. 4 is a block diagram of the claimed receiver.

The claimed receiver (FIG. 4) comprises an antenna 1, a radio-frequency converter 2, an N-channel digital correlator 3, comprising N channels 4 ($4_1, 4_2 \ldots 4_N$) and a processor 5 connected in series.

Figure 5:
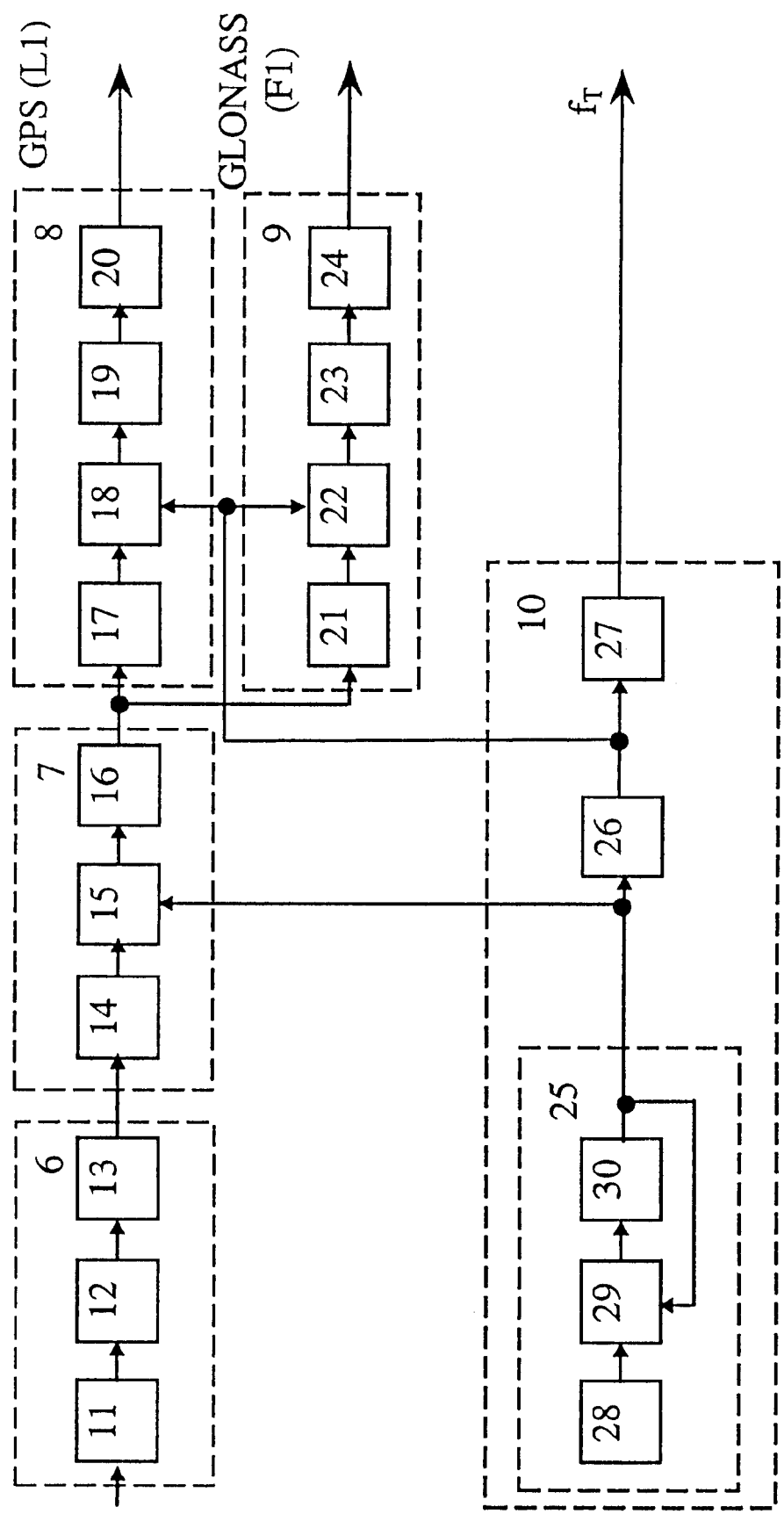
FIG. 5 is a block diagram of the radio-frequency converter of the claimed receiver in one embodiment of the invention.

In the considered embodiment of the invention (see FIG. 5) the radio-frequency converter 2 comprises an input unit 6, a unit 7 for a first conversion of the frequency of signals, a first channel 8 and a second channels 9 for the second conversion of the frequency of signals of the SRNS GPS and GLONASS, respectively, and an apparatus 10 for shaping the signals of the clock and heterodyne frequencies. The input unit 6, solving the problem of prefiltering the input signals of the SRNS GPS and GLONASS systems, should include at least one band-pass filter. In the embodiment in question, having found practical application, the unit 6 comprises a first band-pass filter 11, an amplifier 12 and a second band-pass filters 13 connected in series. The unit 7 solving the problem of the first conversion of frequency of the SRNS GPS and GLONASS signals, should include at least one amplifier and a mixer. In the considered embodiment for practical application, the unit 7 comprises a first amplifier 14, a mixer 15 and a second amplifier 16 connected in series. The channel 8 of the second conversion of frequency of the SRNS GPS signals in the considered embodiment comprises a filter 17, a mixer 18, a controlled-gain amplifier 19 and a threshold device 20 connected in series, said threshold device being made in the form of a two-bit level-controlled quantizer whose output is the output of the channel 8 that is the output of SRNS GPS signals.

Figure 6:
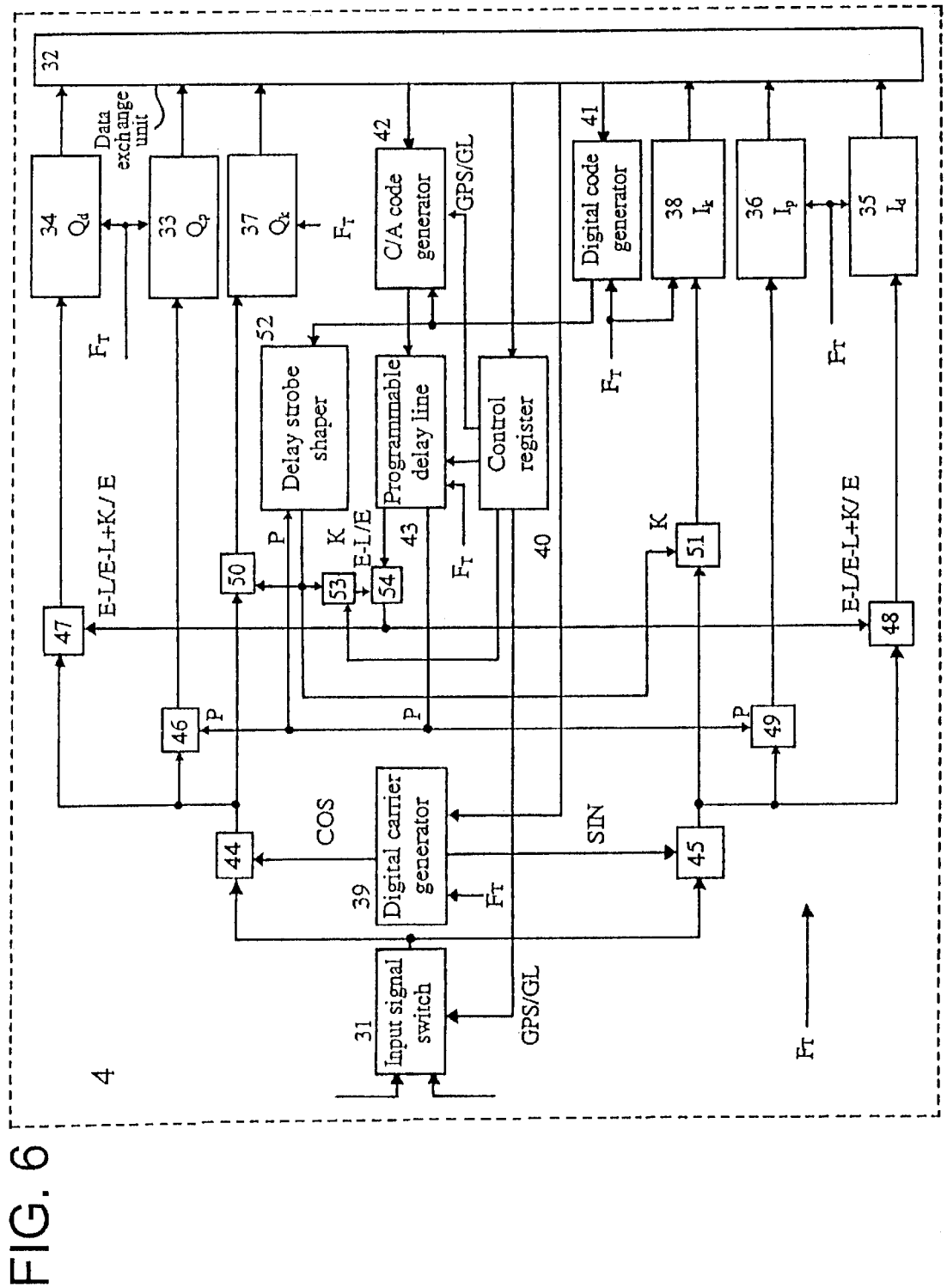
FIG. 6 is a block diagram of the channel of the N-channel digital correlator of the claimed receiver in the considered embodiment.

The channel 9 used for the second conversion of frequency of the SRNS GLONASS signals in the embodiment under consideration comprises a filter 21, a mixer 22, a controlled-gain amplifier and a threshold device 24 connected in series, the threshold device being made as a two-bit level-controlled quantizer whose output is an output of the channel 9 that is the SRNS GLONASS signal output. In the considered embodiment the equipment 10 for shaping the signals of clock and heterodyne frequencies is made as a shaping unit 25 producing the signals of the first heterodyne frequency (synthesizer of signals of the first heterodyne frequency) connected in series with a first 26 and a second 27 units for division of the frequency by eight. In the embodiment in question the unit 25 producing the signals of the first heterodyne frequency is made in the form of a reference generator 28, a phase-locked-loop frequency control unit 29 (PLL) and a voltage-controlled generator 30 connected in series, the output of the unit 25 being connected to the second input of the PLL unit 29. In the equipment 10 the output of the unit 25 is the output of a signal of the first heterodyne frequency, the output of the unit 26 is the output of a signal of the second heterodyne frequency, and the output of the unit 27 is the output of a clock frequency signal. The inputs of the filters 17 and 21, being respectively the inputs of the first 8 and second 9 channels of the second conversion of frequency of signals, are connected to the amplifier output 16, that is to the output of the unit 7 of the first conversion of frequency of signals. The amplifier input 14, being an input of the unit 7, is connected to the output of the unit 6, that is to the output of the filter 13. The input of the band-pass filter 11, being an input of the unit 6, is connected to the antenna 1. The reference input of the mixer 15 of the unit 7 of the first conversion of frequency of signals is connected to the signal output of the equipment 10 producing the first heterodyne frequency, that is to the output of the unit 25 producing signals of the first heterodyne frequency. The reference inputs of mixers 18 and 22 of the channels 8 and 9 for the second conversion of frequency of signals are connected to the output of the signal of the second heterodyne frequency of the equipment 10, that is to the output of the unit 26 for division of the frequency by eight. The outputs of channels 8 and 9 and the output of the clock signal of the equipment 10 are signal and clock outputs of the radio-frequency converter 2. The radio-frequency converter 2 of the claimed receiver is based on the standard, serially produced radio-electronic components. Thus the input unit 6 including the band-pass filters 11, 13 and the amplifier 12, can be built around standard ceramic filters performing the function of band-pass filters and an amplifier such as MGA-87563 unit of the HEWLETT-PACKARD company. The amplifier 14, mixer 15 with the generator 30 of the unit 25 included into the unit 7 for the first conversion of frequency may be based on a microcircuit such as UPC2715 of the NEC company, and the amplifier 16 of the unit 7 may be based on the chip MC13142 of the MOTOROLA company. The filters 17 and 21 in the channels 8 and 9 of the second signal conversion of frequency can be made as band-pass filters of surface-acoustic waves (SAW), for example, those described in [10, page 217–220]; the mixers 18, 22 and gain-controlled amplifiers 19, 23 can be made, for example, using the microcircuits such as UPC2753 of the NEC company, and the threshold devices 20, 24 (two-bit level-controlled quantizers) may be based on the double comparators such as MAX 962 of the MAXIM company. In so doing the gain can be controlled, for example, using the standard analog gain control circuits (AGC). The reference generators 28 used in the unit 25 can be made as a quartz-crystal oscillator generating a signal with a frequency of 15.36 MHz. In particular, a temperature-compensated quartz-crystal oscillator can be used, such as TEMPUS-LVA of the MOTOROLA company. The phase-locked-loop frequency control unit 29 in the unit 25 can be made, for example, using a microcircuit such as LMX2330 of the NATIONAL SEMICONDUCTOR company, which comprises input frequency dividers, reference frequency dividers, a phase detector, a buffer and internal registers ensuring the operation of the PLL control unit 29. The frequency division factors of these dividers of the unit 29 based on the standard microcircuit LMX2330 are set by the external signals, that is by the numerical codes acting on the respective inputs of this microcircuit, for example, from the processor 5 via a series interface (not shown in FIG. 5). The division factors of the above dividers are set stemming from the selected relation between the reference frequency (15.36 MHz) and the first heterodyne frequency (1413.12 MHz). The reference frequency division factor is 8, the generator frequency division factor is 25–736, the comparison frequency is 1.92 MHz. In this case, the phase detector of the unit 29 produces a voltage corresponding to the phase mismatch at the output of the frequency dividers of the generator 30 (microcircuits MC13142 of the MOTOROLA company) and the reference frequency provided by the generator 28, which is used for the frequency control of the generator 30 with the help of its control element (varicap). This voltage is applied to the varicap of the generator 30 through an RC filter included into the structure of the unit 29 shaping the transfer characteristic of the PLL loop with a frequency band of 50 kHz. Such a design of the unit 25 built around the above microcircuits corresponds to the standard structure of frequency synthesizers (cf. [11], page 2–3 . . . 2–14, FIG. 6). The frequency division units 26 and 27 dividing the frequency by eight can be based on standard frequency dividers, such as MC12095 of the MOTOROLA company, operating in the mode of division by 2, and frequency dividers MC12093 of the MOTOROLA company, operating in the mode of division by 4.

In the considered embodiment of the claimed receiver each of the channels 4 of the N-channel digital correlator 3 (FIG. 6) comprises an input signal switch 31 whose first and second inputs, being the GPS and GLONASS signal inputs, are connected to the first and second signal inputs of the N-channel digital correlator 3. The channel 4 also comprises a data exchange unit 32 connected through respective data buses to the input of the processor 5 and to the outputs of the first 33, second 34, third 35, fourth 36, fifth 37 and sixth 38 storage units, as well as to the control input of the digital carrier generator 39, control input of the control register 40, control input of the digital code generator 41 and to the first input of the reference C/A code generator 42. The channel 4 also includes a programmable delay line 43, digital mixers 44 and 45 of the inphase and quadrature correlation processing channels, respectively, a first 46, a second 47, a third 48, a fourth 49, a fifth 50 and a sixth 51 correlators, a delayed strobe shaper 52, a key 53 and an adder 54. The clock inputs of the storage units 33–38, digital code generator 41, digital carrier generator 39 and programmable delay line 43 are connected to the clock input of the N-channel digital correlator 3. The output of the switch 31 is connected to the first inputs of the digital mixers 44 and 45 of the inphase and quadrature correlation processing channels whose second inputs are connected, respectively, to the "cosine" and "sine" outputs of the digital carrier generator 39 while the outputs are connected to the junction between the inputs of the first 46, second and fifth 50 correlators and to the junction between the first inputs of the third 48, fourth 49 and sixth 51 correlators whose outputs are connected, respectively, to the signal inputs of the first 33, second 34, fifth 37, third 35, fourth 36 and sixth 38 storage units. The second inputs of the first 46 and fourth 49 correlators are connected to the output of the punctual "P" reference copy of the C/A code of the programmable delay line 43 whose first input is connected to the output of the reference C/A code generator 42 whose second input is connected to the output of the digital code generator 41. The second input of the programmable delay line 43 and the third input of the reference C/A code generator 42 are connected, respectively, to the first and second outputs of the control register 40 whose third output is connected to the third input of the input signal switch 31. The first input of the adder 54 is connected to the output of the difference "E–L" or early "E" reference copy of the C/A code of the programmable delay line 43, the second input is connected to the output of the key 53, and the output is connected to the second inputs of the second 47 and third 48 correlators. The output of the delayed strobe shaper 52 is connected to the second inputs of the fifth 50 and sixth 51 correlators and to the signal input of the key 53 whose control input is connected to the fourth output of the control register 40. The first input of the delayed strobe shaper 52 is connected to the output of the punctual "P" copy of the reference C/A code of the programmable delay line 43 while its second input is connected to the output of the digital code generator 41. The N-channel digital correlator 3 in the given structure of the channels can practically be made as a LSI circuit of large-scale integration using the libraries of standard elements, for example, of the SAMSUNG ELECTRONICS or SGS TOMSON companies.

The operation of the claimed receiver will be considered on an example of reception and processing of the SRNS GPS and GLONASS signals, using the lettered frequencies from i=0 to i=12 in the SRNS GLONASS signals. These lettered frequencies are used in accordance with the "Interface Control Document" [1]. The claimed receiver operates as follows.

Figure 7:
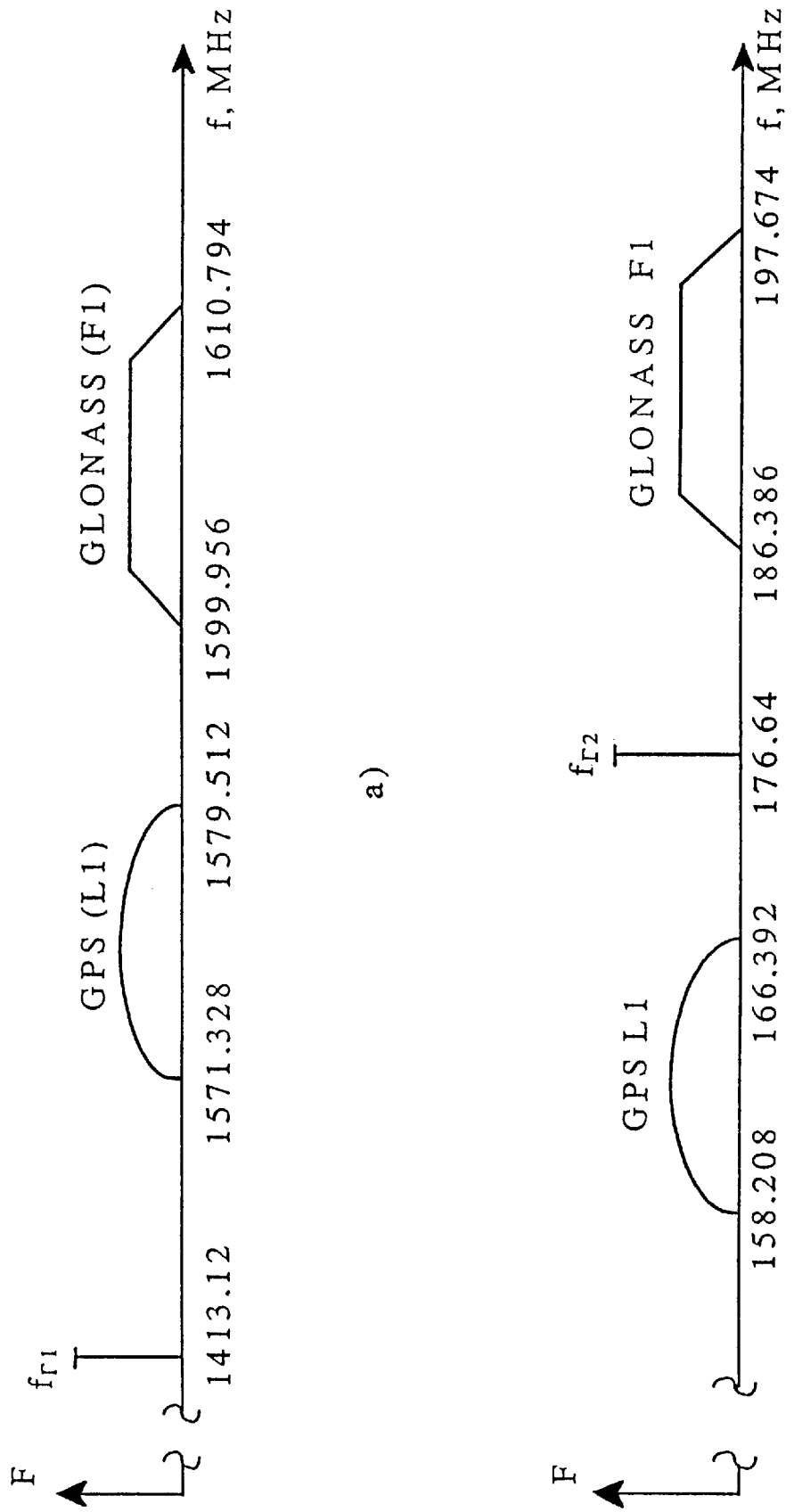
FIG. 7 shows the frequency diagrams illustrating the allocation of the frequency bands of the received SRNS GPS and GLONASS signals in the L1 range of the radio-frequency converter of the claimed receiver before the first conversion of frequency.
Figure 8:
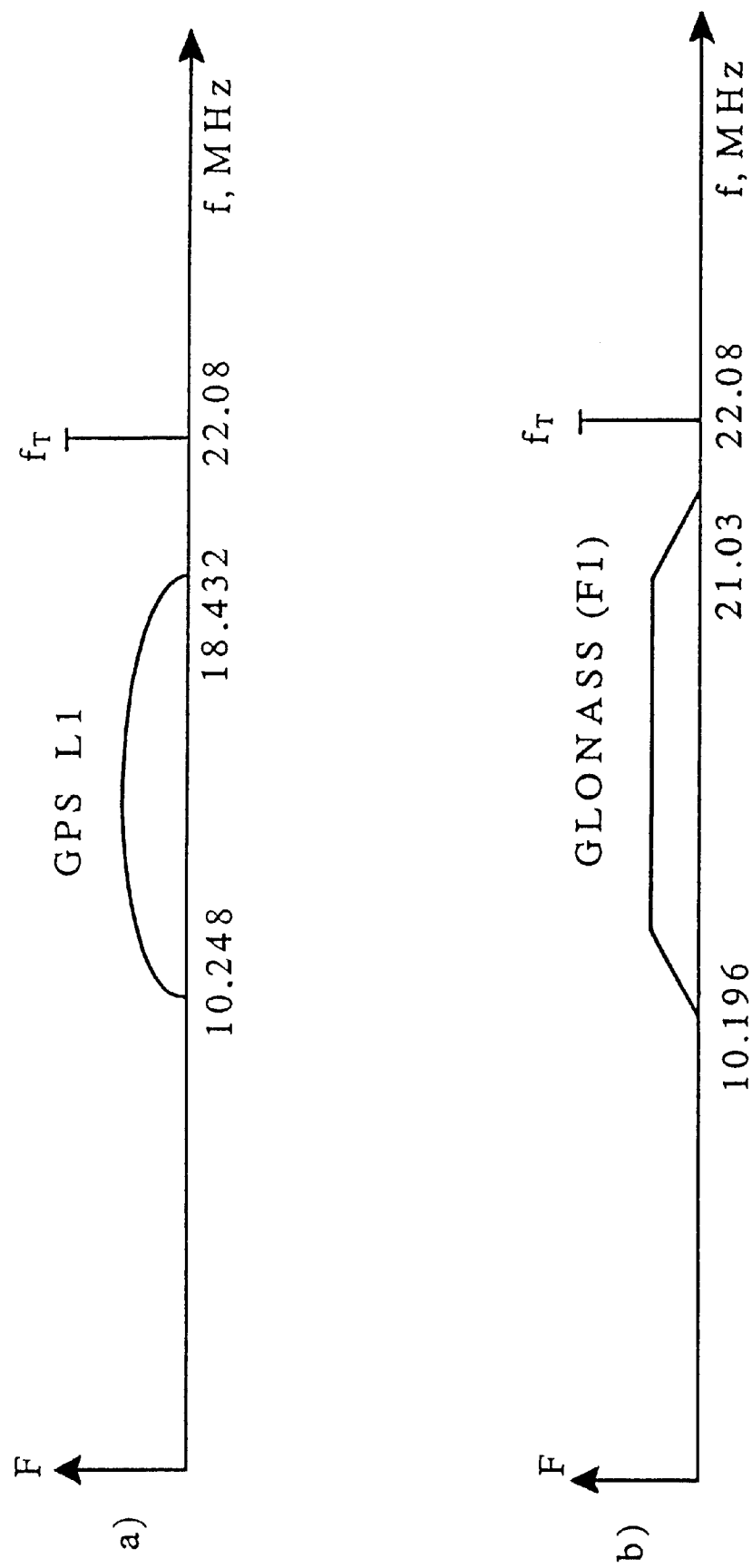
FIG. 8 shows the frequency diagrams illustrating the allocation of the frequency bands of the SRNS GPS and GLONASS signals in the radio-frequency converter of the claimed receiver after the first conversion of frequency.

The SRNS GPS and GLONASS signals received by the antenna 1 (FIG. 4) in the L1 frequency range act on the input of the radio-frequency converter 2 (FIG. 5) and fed to the input of the first band-pass units 11 of the input unit 6 performing the frequency filtering of the signals in the given frequency range. The SRNS GPS signals in the considered case occupy a frequency band $\Delta F=8.184$ MHz and the SRNS GLONASS signals occupy a frequency band $\Delta F=10.838$ MHz. The frequency bands of the SRNS GPS and GLONASS signals are not crossed. The position of the frequency bands occupied on frequency axis by the SRNS GPS and GLONASS signals in the considered case is shown in FIG. 7a, where the frequency band of the SRNS GPS signals is allocated with a range of 1571.28 to 1579.512 MHz and the frequency band of the SRNS GLONASS signals occupies a frequency range of 1599.956 to 1610.794 MHz. From the output of the filter 11 (FIG. 5) the SRNS GPS and GLONASS signals are fed through the amplifier 12 to the input of the filter 13, which in the given case can be made similarly to the filter 11 and have the same amplitude-frequency characteristic. The use of two band-pass filters 11 and 13 interconnected through the amplifier 12 allows one to obtain the required frequency selectivity characteristics of the input unit 6 and a low signal-to-noise ratio with a total passband, for example, of 40 MHz. From the output of the unit 6 of the radio-frequency converters 2 (FIG. 5) the SRNS GPS and GLONASS signals of the $L_1$ ($F_1$) frequency range are applied to the input of the unit 7 of the first conversion of frequency of signals, where these signals are amplified in the first amplifier 14, converted by frequency in the mixer 15 and amplified in the second amplifier 16 (IF amplifier). For the first conversion of frequency performed in the mixer 15 of the unit 7 of the claimed receiver, use is made of the signal of the first heterodyne frequency $f_{r1}=1413.12$ MHz synthesized in the unit 25 with the help of the generator 30 and the PLL units 29 from the reference signals having a frequency of 15.36 MHz and generated by the reference generator 28. As a result of the first frequency conversion, the position of the frequency bands occupied by SRNS GPS and GLONASS signals on the frequency axis varies as shown in FIG. 7b, where the frequency band of SRNS GPS signals is 158.208–166.392 MHz and the SRNS GLONASS signals occupy a band of 186.386–197.674 MHz. The choice of the first heterodyne frequency of the radio-frequency converter ($f_{r1}=1413.12$ MHz) is made so that the second heterodyne frequency ($f_{r2}=\frac{1}{8} \times f_{r1}=176.64$ MHz) is allocated between the upper boundary of the frequency range of the converted SRNS GPS signals and the lower boundary of the frequency range of the converted SRNS GLONASS signals (FIG. 7). The SRNS GPS and GLONASS signals converted in the unit 7 of the radio-frequency converter 2 from the output of the amplifier output 16 are applied to the inputs of the first 8 and second 9 channels of the second conversion of frequency of signals, that is to the inputs of the filters 17 and 21. Each of these filters performs band-pass filtering of the respective SRNS signals, namely, the filter 17 performs filtering of the SRNS GPS signals and filter 21 performs filtering of the SRNS GLONASS signals. The filters 17 and 21 have passbands of 8.2 MHz and 10.8 MHz, respectively, and center frequencies of 162.3 MHz and 192.3 MHz respectively. The signals filtered with the help of the filters 17 and 21 from out-of-band interference and allocated in the systems (GPS and GLONASS) after the frequency conversion stage in each of the channels 8 and 9 are applied to the signal inputs of the mixers 18 and 22 respectively. For the second conversion of frequency performed in the mixers 18 and 22 of the channels 8 and 9, in the radio-frequency converter 2 of the claimed receiver use is made of the signal of the second heterodyne frequency $f_{r2}=176.64$ MHz generated with the help of the unit 26 dividing the frequency of the signal of the first heterodyne frequency synthesized by the unit 25 by eight. As a result of the second frequency conversion, the position of the frequency bands occupied by SRNS GPS and GLONASS signals on the frequency axis varies as shown in FIG. 8, where FIG. 8a illustrates the frequency band of SRNS GPS signals (10.248–18.432

MHz), FIG. 8b is the frequency band of the SRNS GLONASS signals (10.196–21.034 MHz). The SRNS GPS and GLONASS signals converted with the help of the mixers 18 and 22 in each of the second frequency conversion channels 8 and 9 are amplified in the gain-controlled amplifiers 19 and 23, then are subjected to three-level (two-bit) conversion in the threshold devices 20 and 24, which are two-bit level-controlled quantizers, thereby producing the necessary type of the output signals of the radio-frequency converter 2 of the claimed receiver. These signals ("real" signals) are characterized by the presence of a carrier which is "removed" in the channels 4 of the N-channel correlator 3, namely, in the digital mixers 44 and 45 of the inphase and quadrature correlation processing channels. The signals generated in the radio-frequency converter 2 are then digitized in the N-channel digital correlator 3 with a clock rate FT, defined by the clock frequency signal produced with the help of the unit 27 from the output signals of the unit 26 of the radio-frequency converters 2, that is from the signal of the second heterodyne frequency $f_{r2}$=176.64 MHz, by dividing the frequency fr2 by eight. Thus, the clock rate value used during the digital signal processing in the N-channel digital correlator 3 accounts to $F_T$=22.08 MHz. To perform the digitization in time without losses of the navigational information, the converted SRNS GPS and GLONASS signals and clock frequency signal are matched to each other, namely, the value of the clock frequency $F_T$ and the value of the frequency band of the converted SRNS GPS and GLONASS signals are in an approximate ratio of 2:1.

Thus, in the claimed receiver the following heterodyne and clock signals are shaped: of the first heterodyne frequency $f_{r1}$=1413.12 MHz, the second heterodyne frequency $f_{r2}$=176.64 MHz and clock frequency $F_T$=$f_{r2}$: 8=176.64:8. Thus, a signal of the second heterodyne frequency and a signal of the clock frequency are obtained from the first heterodyne frequency signal by simple successive division of this frequency by eight using the units 26 and 27.

Figure 9:
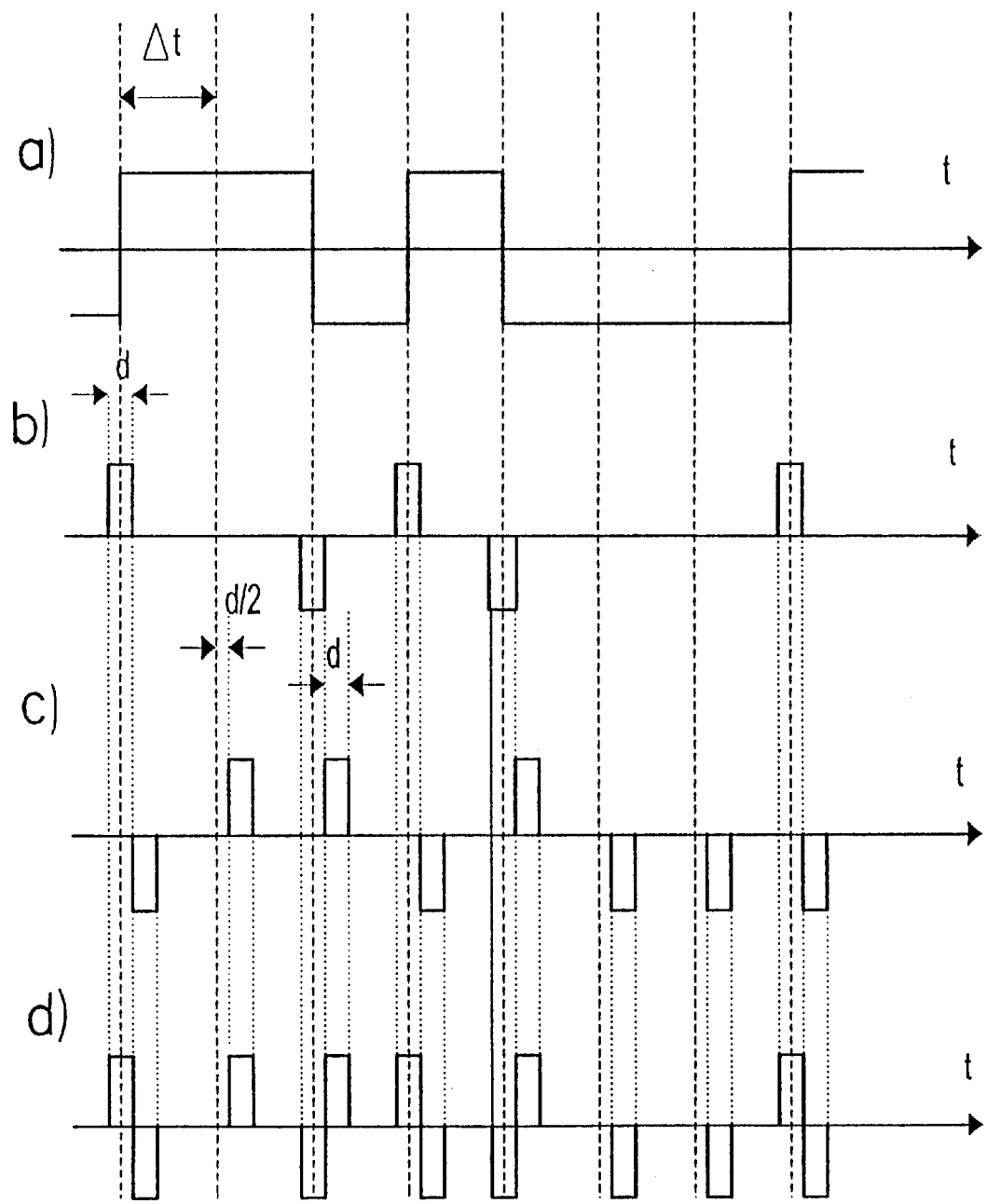
FIG. 9 shows the symbolical sequences illustrating the operation of the channel elements of the N-channel correlator: a pseudorandom sequence at the output of the reference C/A code generator (FIG. 9a), the difference "E–L" pseudorandom sequence used under the "narrow correlator" condition produced by the programmable delay line (FIG. 9b), a sequence of correcting strobes at the output of the delayed strobe shaper (FIG. 9c), a difference pseudorandom sequence added to the sequence of correcting strobes for correcting the multipath distortion at the adder output (FIG. 9d)
Figure 10:
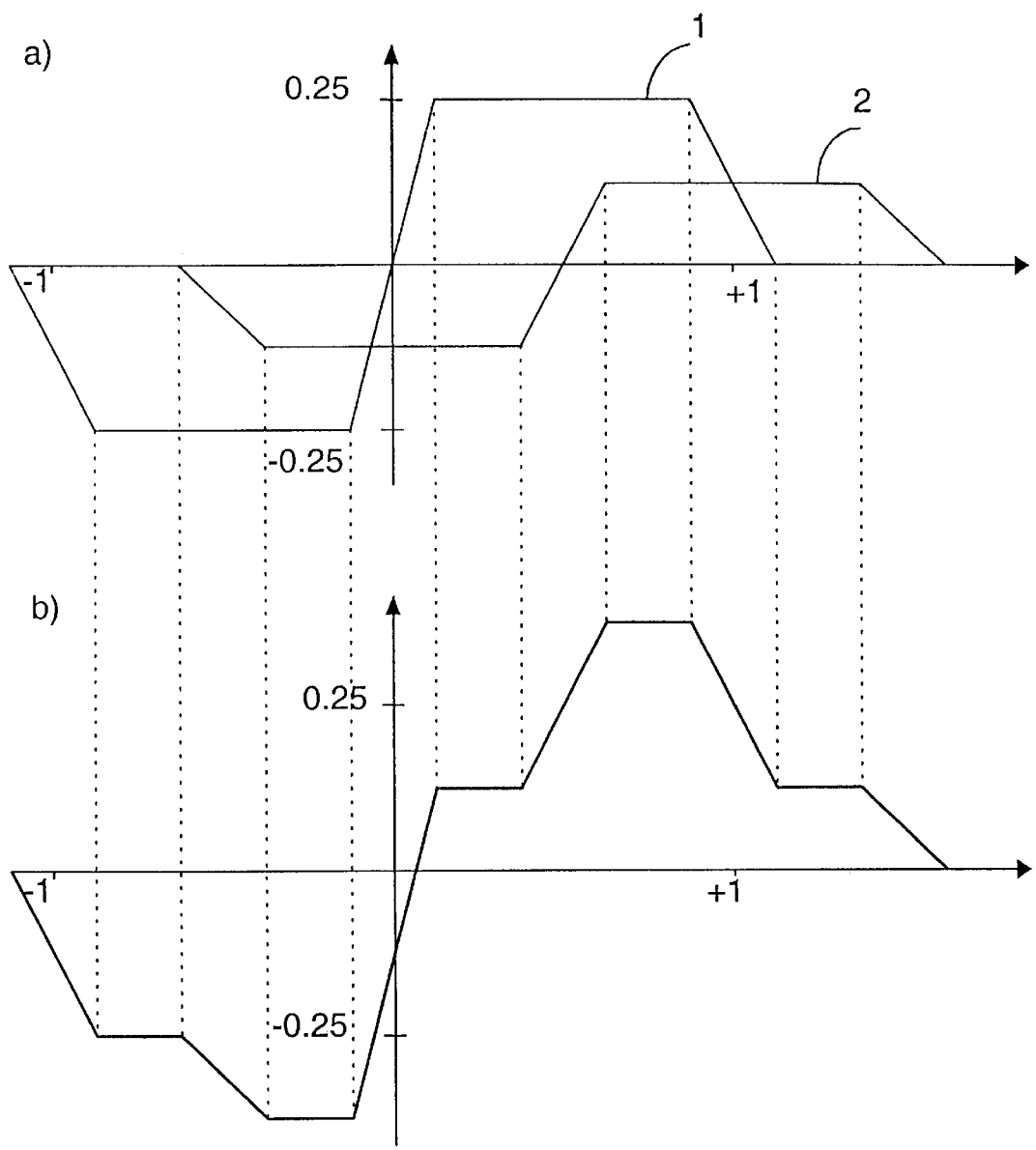
FIG. 10 shows the diagrams illustrating the distortion of the difference signal from the "narrow correlator>>" output due to the presence of a reflected (multipath) signal.
Figure 11:
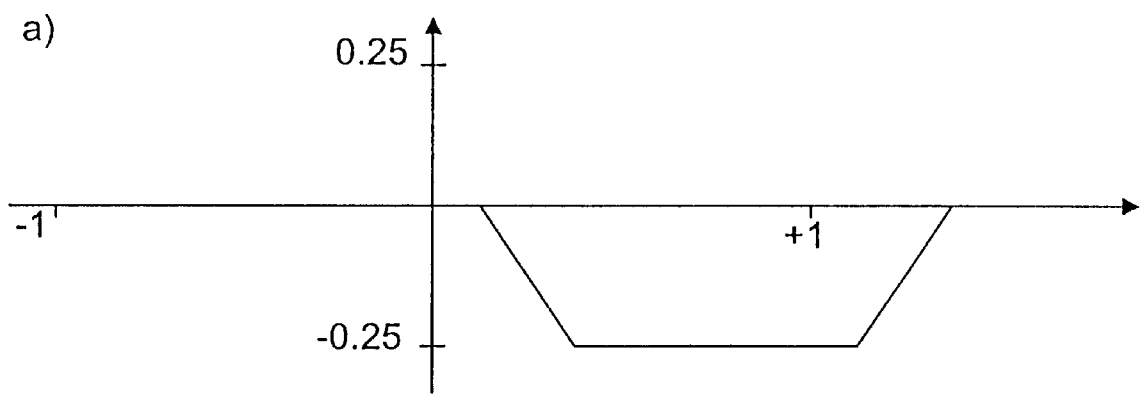
FIG. 11 shows the correlation function of gate digital signal (shown in FIG. 9d) compensating the multipath distortion (FIG. 11a) and the joint correlation function of the <<narrow correlator>> and correcting gate signal (FIG. 11b)
Figure 11:
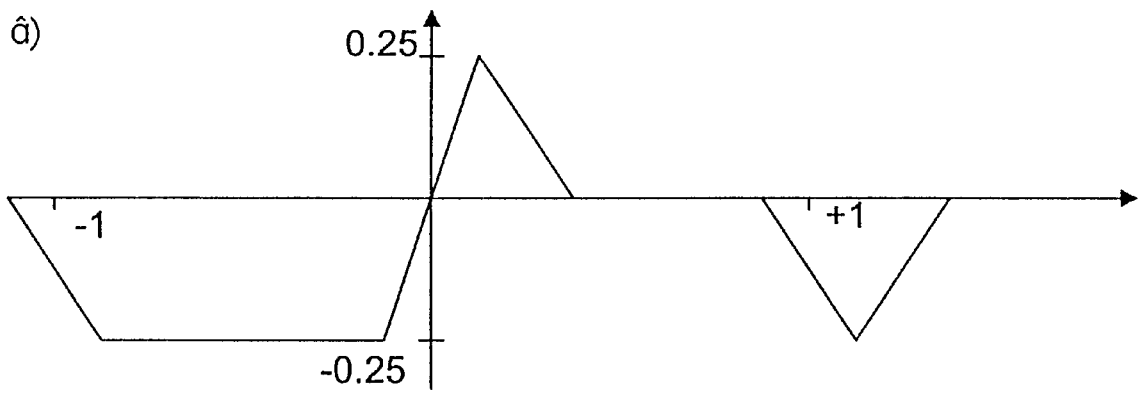
Figure 12:
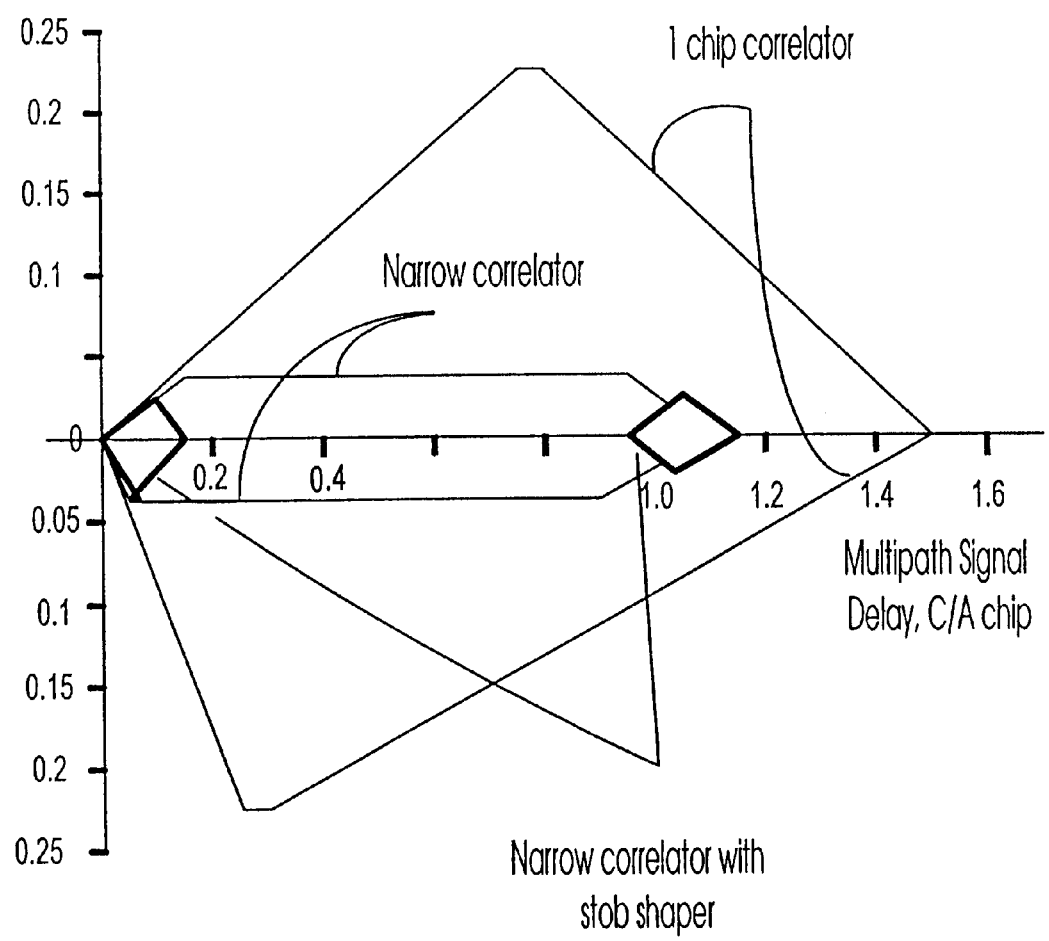
FIG. 12 shows the diagrams of the calculated errors due to due to the presence of multipath signals for different types of correlators.

Therefore, in the claimed integrated receiver the first and second parts of the formulated technical task are achieved: firstly, the simultaneous reception and conversion of the SRNS GPS and GLONASS signals with lettered frequencies from i=0 to i=12 of the L1 frequency range is carried out by means of a single frequency synthesizer (unit 25) for producing the signals of the clock and heterodyne frequencies and, secondly, there is no device similar to the prior art digitizer. Furthermore, the clock frequency of the produced signal (sampling rate of the accepted signals with time) is matched with a spectrum of the SRNS GPS and GLONASS signals converted in the radio-frequency converter The third part of the formulated task is solved in the N-channel digital correlator 3, namely, in its N channels 4, allowing the signals of several satellites to be traced simultaneously. The operation of the N-channel digital correlator 3 will be discussed on an example of operation of its one channel 4 when processing the signals of one satellite. The operation of the 4 is carried out as follows. The two-bit quantized "real" SRNS GPS and GLONASS signals are applied to the signal inputs of the N-channel digital correlator 3 from the respective outputs of the radio-frequency converter 2. From the signal inputs of the N-channel digital correlator 3 the input GPS and GLONASS signals are fed through each of the channels 4 to the switch 31 which selects one of the two signals (GPS or GLONASS) by a command from the processor 5 acting through the data exchange unit 32 for processing this signal in the channel. The digital carrier generator 39 generates an inphase (cos) and quadrature (sin) phase components of the reference signal carrier frequency, which are multiplied by the input signal in the digital mixers 44 and 45. The digital carrier generator 39 is controlled by the processor 5 through the data exchange unit 32 for closing the loops of tracing the frequency and phase of the input signal carrier. After the carrier has been "removed", the inphase and quadrature components of the signal are correlated in the correlators 46–49 with the copies of the reference C/A code produced with the help of the following set of units: a digital code generator 41, a reference C/A code generator 42 (GPS and GLONASS), a programmable delay line 43, a delayed strobe shaper 52, a key 53 and an adder 54. The digital code generator 41 generates a clock signal of the C/A code (GPS and GLONASS) which is then applied to the input of the reference C/A code generator 42 (GPS and GLONASS). The digital controlled code generator 41 is controlled by the processor 5 through the data exchange unit 32 for closing the code tracing loop (code delay). By referring to the clock signal of the C/A code from the digital code generator 41, the reference C/A code generator 42 generates a reference C/A code, which is unique for each SRNS GPS satellite and is identical to all SRNS GLONASS satellites, using the frequency division multiplex. The code sequence type is set by the processor 5 connected to the reference C/A code generator 42 through the data exchange unit 32. The reference C/A code generated by the code generator 42 is applied to the programmable delay line 43. The programmable delay line 43 performs a temporary shift of the reference C/A code, by shaping at its two outputs a exact "P" (punctual) and a difference "E–L" (early-minus-late) copies of the reference C/A code. The exact "P" (punctual) copy of the reference C/A code is applied to the second inputs of the first 46 and fourth 49 correlators and to the first input of the delayed strobe shaper 52, while the difference "E–L" (early-minus-late) copy of the reference C/A code is applied to the first input of the adder 54. The delayed strobe shaper 52, using the code clock frequency signal fed from the output of the digital code generator 41 to its second input, and the information on the polarity of the current character of the C/A code fed to its first input from the programmable delay line 43, determines the boundaries of code characters and generates a train of gate signals for multipath compensation whose duration is equal to the delay d between the early and late copies of the code, the repetition period being equal to the duration of C/A code character and the polarity coincides with the polarity of the preceding characters of the punctual copy of the code, and the beginning is delayed by a value d/2 relative to the end of the character of the punctual copy of the code. With the closed key 53, the adder 54 receives a signal of the difference copy of the reference C/A code from the output of the reference C/A code generator 42 and a train of gating pulses from the output of the delayed strobe shaper 52 producing at its output a difference discriminator signal with correcting gate pulses for multipath compensation, said signal being applied to the second inputs of the second 47 and third 48 correlators. With the open key 53, at the output of the adder 54 and, therefore, at the second inputs of the correlators 47, 48 there is simply a difference copy of the code. The results of the correlation of the received SRNS GPS and GLONASS signals with the exact "P" (punctual) copy and the difference copy with a correcting strobe "E–L+K" of the C/A code are accumulated within a time period equal to the duration of code epoch (1 ms), in the storage units 33–36, read out by the processor 5 through the data exchanges unit 32 and used for closing the loops of tracing the code and carrier. The additional fifth 50 and sixth 51 correlators and fifth 37 and sixth 38 storage units allow the processor 5 to evaluate the reflected signal power. What is essential is the fact that in each of the channels 4 of the N-channel digital correlator 3 said operation on adding the result of correlation of the train of delaying strobes and input signal to the signal from the output of the difference discriminator by closing the key 56 is carried out only after the system has been put in the code tracing mode under "narrow correlator" conditions, i.e. after the interval between the early "E" and late "L" copies of the code is reduced by the processor 5, when tracing the code with the help of the programmable delay line 43, to a minimum value. Apart from it, when using the separate correlators and storage units performing the correlation of a train of delaying strobes with the input signal, the result of such a correlation can be estimated by the calculator for the purpose of determining the multipath effect intensity. It allows the operator to pass from the conventional mode of "narrow correlator" to the "narrow correlator with a correcting strobe" only if the reflected signal essentially increases the amount of errors during the code tracing process. This approach is advantageous compared to the use of the usual "narrow correlator" mode, that is extremely important for the receivers of the C/A code of the SRNS GPS and GLONASS systems, in which, on the one hand, the power of the input signal is very low and is much below the noise level and, on the other hand, the power of the reflected signal can reach a significant value that in some cases is equal to or even higher than the power of the forward signal thus causing essential errors when determining the consumer coordinates. The use of the correcting sequence of gating digital signals allows one to completely eliminate influence the multipath effect at a delay factor of the reflected signal greater than 1.5 d and reduces its negative influence starting from the delay factor exceeding d/2. In so doing the power losses in comparison with the pure "narrow correlator" mode are increased by only 1.76 dB. FIG. 9 illustrates the above-described operation of the channel 4 of the N-channel correlator 3 shaping the trains of characters. Shown in FIG. 9a is a pseudorandom sequence at the output of the reference C/A code generator 42 with a duration of code character of Δt. FIG. 9b shows the difference "E–L" pseudorandom sequence used in the usual "narrow correlator" mode and formed by the programmable delay line 43. FIG. 9c shows the train of correcting strobes at the output of delayed strobe shaper 52. Finally, FIG. 9d shows the sum signal at the output of the adder 54, i.e. the signal of the difference pseudorandom sequence added to the sequence of correcting strobes for correcting the multipath distortion. FIG. 10 illustrates the negative influence of the multipath phenomenon on the "narrow correlator" operation during the joint operation of the channel of the 4 N-channel digital correlator 3 and processor 5. Curve 1 in FIG. 10a is the inverted output of the discriminator of the system of tracing the code stipulated by the forward signal (mutual correlation function of the pseudorandom C/A code modulating the received signal and the difference "E–L" of the pseudorandom sequence). Curve 2 is the response of the discriminator of the system tracing the code on the delaying (multipath) signal whose amplitude is equal to half the amplitude of the forward signal and the delay makes half the duration of the pseudonoise code sequence character. The delay between the early and late copies of the signal is equal to 0.25 character length. For simplicity, the calculation will be made for the ideal case of the IF filter with an infinite passband. In the case of arrival of both signals, the output of the discriminator represents a resulting response to the forward and delayed signal (in FIG. 10b the signal is inverted). It is obvious that in this case the zero output of the discriminator corresponds to a non-zero delay of the forward signal, i.e. the error in determining the distance due to the multipath effect. The use of the correcting gate signals together with the "narrow correlator" allows one to reduce this negative effect. It is illustrated in FIG. 11. FIG. 11a shows the result of correlation of the correcting sequence of strobes with a pseudonoise code sequence of the received signal. By combining it with the output of the "narrow correlator" discriminator (curve 1 in FIG. 10a), we get the discriminator output using the "narrow correlator with correcting strobes", shown in FIG. 11b (inverted signal). It is obvious that in this case the multipath signals with a delay greater than 1.5 d have no effect on the discriminator signal. In fact, there is a danger of occurrence of an erroneous discriminator signal at a delay of the multipath signal of about one character (negative triangle near the delay+1) but, as a rule, the multipath signals with such a delay have a low amplitude and their negative effect is insignificant. FIG. 12 illustrates the calculated diagram of errors of the range measurement using the signal of the C/A code of the SRNS GPS and GLONASS depending on the multipath signal delay. The combination of the forward and multipath signals is described by the expression:

$$Sm(t)=A\cdot C_f(t)\cos(w0t+\phi)+\alpha\cdot A\cdot C_f(t-\delta)\cdot\cos[w0(t-\delta)+\phi],$$

Where
    A—is the forward signal amplitude,
    $C_f(t)$—is the pseudorandom sequence modulating the signal
    w0—is the carrier frequency,
    φ—is the carrier phase,
    α—is the relative amplitude of the multipath signal,
    δ—is the delay factor of the multipath signal relative to the forward signal.

Using the incoherent discriminator of the type $I_{E-L}I_P+Q_{E-L}Q_P$ [6] for the steady-state conditions of tracing in the case of usual "narrow correlator", the signal at the discriminator output of the code tracing system takes a form of $$E(\tau_k)=[R_f(\tau_k-d/2)-R_f(\tau_k+d/2)]R_f(\tau_k)+\alpha^2[R_f(\tau_k-d/2-\delta)-R_f(\tau_k+d/2-\delta)]$$

$$R_f(\tau_k-\delta)+\alpha[R_f(\tau_k-d/2)-R_f(\tau k+d/2)]R_f(\tau_k-\delta)\cos\phi_m+\alpha[R_f(\tau_k-d/2-\delta)-R_f(\tau_k+d/2-\delta)]R_f(\tau_k)\cos\phi_m$$

Where $R_f(\tau)$ is the autocorrelation function of the pseudorandom sequence modulating the signal,
    $\tau_k$ is the code tracing error,
    d is the delay between the early and late copies of the code,
    $\phi_m=w0\cdot\delta$ is the phase difference between the direct and delayed signals.

For the case of using the "narrow correlator with correcting strobes", the signal at the output of discriminator takes a form:

$$E(\tau_k)=[R_f(\tau_k-d/2)-R_f(\tau_k+d/2)]R_f(\tau_k)+\alpha^2[R_f(\tau_k-d/2-\delta)-R_f(\tau_k+d/2-\delta)]$$

$$R_f(\tau_k-\delta)+\alpha[R_f(\tau_k-d/2)-R_f(\tau_k+d/2)]$$

$$R_f(\tau_k-\delta)\cos\phi_m+\alpha[R_f(\tau_k-d/2-\delta)-R_f(\tau_k+d/2-\delta)]R_f(\tau_k)\cos\phi_m++S_f(\tau_k+1+d/2)R_f(\tau_k)+\alpha^2 S_f(\tau_k+1+d/2-\delta)$$

$$R_f(\tau_k-\delta)+\alpha S_f(\tau_k+1+d/2)R_f(\tau_k-\delta)\cos\phi_m+\alpha S_f(\tau_k+1+d/2-\delta)R_f(\tau_k)\cos\phi_m,$$

where $S_f$ is the correlation function of the train of correcting strobes with relative duration d and the pseudonoise sequence modulating the signal being received. By setting $\phi_m=0$ and then $\phi_m=\pi\alpha=0.5$, $d=0.1$ and solving the above equations for the case $E(\tau_k)=0$, we can calculate the error of determining the range. For the sake of simplicity, shown in FIG. 12 are the results of the error calculation in determining the range when using the radio-frequency converter of the ideal filter with an infinite passband not distorting the shape of the characters of the pseudonoise sequence modulating the signal. Thus the third technical task is realized, i.e. in many practically important cases the digital correlators eliminate the error of tracing the C/A code caused by multipath effects.

INDUSTRIAL APPLICABILITY

The proposed structure of the claimed receiver provide can be realized on the basis of standard radio-electronic components produced in a mass quantity in industry, which is important under conditions of serial production. All this creates favorable premises for use of the claimed integrated receiver by a wide range of users for determining their location by the signals of the C/A code of the SRNS GPS and GLONASS systems. From the above it is clear that the claimed invention is feasible, industrially applicable, achieves the formulated engineering task and is very promising as portable receivers operating simultaneously with signals of the SRNS GPS and GLONASS C/A code and providing the "standard accuracy" in the navigational measurements.

What is claimed is:

1. A receiver of pseudonoise signals of satellite radio navigation systems comprising:
   an antenna;
   a radio-frequency converter connected in series with the antenna;
   an N-channel digital correlator connected to the radio frequency converter; and
   a processor connected to the N-channel digital correlator, wherein:
   the antenna is adapted to receive signals of satellite radio navigation systems GPS and GLONASS,
   the radio-frequency converter comprises:
      an input unit connected to the antenna and including at least one band-pass filter connected to the output of the input unit,
      a first unit which performs first conversion of frequency of the signals of the satellite radio navigation systems GPS and GLONASS, the unit comprising at least a first amplifier and a first mixer connected to the output of the unit for first conversion of frequency of signals,
      a first channel and a second channel which perform second conversion of the frequency of signals of the satellite radio navigation systems GPS and GLONASS, respectively, the first channel comprises a first filter and a second mixer connected in series, and the second channel comprises a second filter and a third mixer connected in series,
      a second unit which generates a signal of a first heterodyne frequency,
      a third unit which generates a signal of clock frequency and a signal of a second heterodyne frequency,
      wherein an output of the signal of the first heterodyne frequency is connected to a reference input of the first mixer of the first unit, an output of the signal of the second heterodyne frequency is connected to a reference input of the second mixer and to a reference input of the third mixer, and outputs of the first and second channels and an output of the signal of the clock frequency form a first signal output, a second signal output and a clock output of the radio-frequency converter;
   the N-channel digital correlator comprises:
      a first signal input, a second signal input and a clock input respectively connected to the first signal output, the second signal output and the clock output of the radio frequency converter, and
      N channels, each of the N channels comprising:
         an input signal switch having first and second inputs connected to the first and second signal inputs of the N-channel digital correlator,
         a data exchange unit,
         first, second, third, fourth, fifth and sixth storage units,
         first, second, third, fourth, fifth and sixth correlators,
         a digital carrier generator,
         a control register,
         a digital code generator,
         digital mixers of in-phase and quadrature correlation processing channels,
         a reference C/A code generator,
         a programmable delay line,
         an in-phase and a quadrature correlation processing channels,
         a shaper of delayed strobes,
         a key, and
         an adder,
         wherein
         the data exchange unit is connected through respective data buses to the processor, to outputs of the first, second, third and fourth storage units, to a control input of the digital carrier generator, to a control input of the control register, to a control input of the digital code generator and to a first input of the reference C/A code generator,
         clock inputs of the first, second, third and fourth storage units, the digital code generator, the digital carrier generator and the programmable delay line are connected to the clock input of the N-channel digital correlator,
         an output of the input signal switch is connected to first inputs of the digital mixers of the in-phase and quadrature correlation processing channels,
         second inputs of the digital mixers of the inphase and quadrature correlation processing channels are connected to "cosine" and "sine" outputs of the digital carrier generator, respectively,
         outputs of the digital mixers of the in-phase and quadrature correlation processing channels are connected to a junction between interconnected first inputs of the first and second correlators and to a junction between interconnected first inputs of the third and fourth correlators,
         outputs of the first, second, third, and fourth correlators are connected, respectively, to signal inputs of the first, second, third and fourth storage units,
         second inputs of the first and fourth correlators are connected to an output of a punctual P copy of a reference C/A code of the programmable delay line,
         first input of the programmable delay line is connected to an output of the reference C/A code generator, a second input of the reference C/A code generator is
connected to an output of the digital code
generator,
a second input of the programmable delay line and a
third input of the reference C/A code generator are
connected, respectively, to a first and second outputs of the control register,
a third output of the control register is connected to
a third input of the input signal switch;
an output of the second mixer is connected to the output
of the first channel through a controlled-gain amplifier
and a threshold device made in a form of a two-bit
level-controlled quantizer connected in series;
an output of the second unit is connected to a first
frequency divider and a second frequency divider
which divide the output of the second unit by eight;
outputs of the first and second frequency dividers form,
respectively, the signal of the second heterodyne frequency and the signal of the clock frequency;
outputs of the fifth and the sixth storage units are connected through respective data buses to the data
exchange unit, and clock inputs of the fifth and the sixth
storage units are connected to the clock input of the
N-channel digital correlator;
outputs of the fifth and sixth correlators are connected,
respectively, to signal inputs of the fifth and sixth
storage units;
a first input of the adder is connected to an output of a
difference E–L between an early E and a late L copy, or
the early E copy of the reference C/A code of the
programmable delay line;
a second input of the adder is connected to an output of
the key, and an output of the adder is connected to
second inputs of the second and third correlators;
first inputs of the fifth and sixth correlators are connected,
respectively, to the outputs of the digital mixers of the
in-phase and quadrature correlation processing
channels,
the output of the shaper of delayed strobes is connected to
second inputs of the fifth and sixth correlators and to
signal input of the key,
a control input of the key is connected to a fourth output
of the control register;
a first input of the shaper of delayed strobes is connected
to the output of the punctual P copy of the reference
C/A code of the programmable delay line,
and a second input of the shaper of delayed strobes is
connected to an output of the digital code generator.

2. A receiver of pseudonoise signals of satellite radio
navigation system comprising:
an antenna;
a radio-frequency converter connected in series with the
antenna;
an N-channel digital correlator connected directly to the
radio frequency converter; and
a processor connected to the N-channel digital correlator,
wherein the antenna is adapted to receive signals of
satellite radio navigation systems GPS and GLONASS;
wherein the N-channel digital correlator comprises;
a first signal input, a second signal input and a clock
input respectively connected to the first signal
output, the second signal output and the clock output
of the radio frequency converter, and N channels;
wherein each of the N channels comprises;

an input signal switch having first and second inputs
connected to the first and second signal inputs of the
N-channel digital correlator,
a data exchange unit,
first, second, third, fourth, fifth and sixth storage units,
first, second, third, fourth, fifth and sixth correlators,
a digital carrier generator,
a control register,
a digital code generator,
digital mixers of in-phase and quadrature correlation
processing channels
a reference C/A code generator,
a programmable delay line,
an in-phase and a quadrature correlation processing
channels,
a shaper of delayed strobes,
a key, and
an adder,
wherein
the data exchange unit is connected through respective
data buses to the processor, to outputs of the first,
second, third and fourth storage units, to a control
input of the digital carrier generator, to a control
input of the control register, to a control input of the
digital code generator and to a first input of the
reference C/A code generator,
clock inputs of the first, second, third and fourth storage
units, the digital code generator, the digital carrier
generator and the programmable delay line are connected to the clock input of the N-channel digital
correlator,
an output of the input signal switch is connected to first
inputs of the digital mixers of the in-phase and
quadrature correlation processing channels,
second inputs of the digital mixers of the in-phase and
quadrature correlation processing channels are connected to "cosine" and "sine" outputs of the digital
carrier generator, respectively,
outputs of the digital mixers of the in-phase and
quadrature correlation processing channels are connected to a junction between interconnected first
inputs of the first and second correlators and to a
junction between interconnected first inputs of the
third and fourth correlators,
outputs of the first, second, third, and fourth correlators
are connected, respectively, to signal inputs of the
first, second, third and fourth storage units,
second inputs of the first and fourth correlators are
connected to an output of a punctual P copy of a
reference C/A code of the programmable delay line,
first input of the programmable delay line is connected
to an output of the reference C/A code generator,
a second input of the reference C/A code generator is
connected to an output of the digital code generator,
a second input of the programmable delay line and a
third input of the reference C/A code generator are
connected, respectively, to first and second outputs
of the control register,
a third output of the control register is connected to a
third input of the input signal switch;
wherein outputs of the fifth and the sixth storage units
are connected through respective data buses to the
data exchange unit, and clock inputs of the fifth and
the sixth storage units are connected to the clock
input of the N-channel digital correlator;
outputs of the fifth and sixth correlators are connected,
respectively, to signal inputs of the fifth and sixth
storage units;

a first input of the adder is connected to an output of a difference E–L between an early E and a late L copy, or the early E copy of the reference C/A code of the programmable delay line;

a second input of the adder is connected to an output of the key, and an output of the adder is connected to second inputs of the second and third correlators;

first inputs of the fifth and sixth correlators are connected, respectively, to the outputs of the digital mixers of the inphase and quadrature correlation processing channels, the output of the shaper of delayed strobes is connected to second inputs of the fifth and sixth correlators and to signal input of the key;

a control input of the key is connected to a fourth output of the control register;

a first input of the shaper of delayed strobes is connected to the output of the punctual P copy of the reference C/A code of the programmable delay line; and a second input of the shaper of delayed strobes is connected to an output of the digital code generator.

3. A receiver of pseudonoise signals of satellite radio navigation systems as claimed in claim 2, wherein the radio-frequency converter comprises:

an input unit connected to the antenna and including at least one band-pass filter connected to the output of the input unit, a first unit which performs first conversion of frequency of the signals of the satellite radio navigation systems GPS and GLONASS, the unit comprising at least a first amplifier and a first mixer connected to the output of the unit for first conversion of frequency of signals, a first channel and a second channel which perform second conversion of the frequency of signals of the satellite radio navigation systems GPS and GLONASS, respectively, the first channel comprises a first filter and a second mixer connected in series, and the second channel comprises a second filter and a third mixer connected in series, a second unit which generates a signal of a first heterodyne frequency, a third unit which generates a signal of clock frequency and a signal of a second heterodyne frequency, wherein an output of the signal of the first heterodyne frequency is connected to a reference input of the first mixer of the first unit, an output of the signal of the second heterodyne frequency is connected to a reference input of the second mixer and to a reference input of the third mixer, and outputs of the first and second channels and an output of the signal of the clock frequency form a first signal output, a second signal output and a clock output of the radio-frequency converter.

4. A receiver of pseudonoise signals of satellite radio navigation systems as claimed in claim 2, wherein:

an output of the second mixer is connected to the output of the first channel through a controlled-gain amplifier and a threshold device made in a form of a two-bit level-controlled quantizer connected in series;

an output of the second unit is connected to a first frequency divider and a second frequency divider which frequency divide the output of the second unit by eight;

outputs of the first and second frequency dividers form, respectively, the signal of the second heterodyne frequency and the signal of the clock frequency.

* * * * *